United States Patent [19]
Sobol et al.

[11] Patent Number: 5,463,217
[45] Date of Patent: Oct. 31, 1995

[54] ADAPTER FOR SCANNING TRANSPARENCIES WITH A REFLECTIVE DOCUMENT SCANNER

[75] Inventors: Robert E. Sobol, Fort Collins; Steven L. Webb, Loveland; David W. Boyd, Greeley, all of Colo.

[73] Assignee: Hewlett-Packard Company, Palo Alto, Calif.

[21] Appl. No.: 343,279

[22] Filed: Nov. 22, 1994

Related U.S. Application Data

[63] Continuation-in-part of Ser. No. 112,832, Aug. 26, 1993, abandoned.

[51] Int. Cl.$^6$ .................................. H01J 3/14; H04N 1/40
[52] U.S. Cl. ........................ 250/234; 358/475; 353/25; 356/444
[58] Field of Search ..................... 250/208.1, 234, 250/235; 358/475, 487, 506, 509; 353/25, 26 R, 26 A, 27 R, 27 A; 356/444

[56] References Cited

U.S. PATENT DOCUMENTS

| | | | |
|---|---|---|---|
| 4,481,414 | 11/1984 | Gasper | 356/444 |
| 4,564,290 | 1/1986 | Bell et al. | 356/444 |
| 5,202,774 | 4/1993 | Ishimitsu | 358/475 |

Primary Examiner—Edward P. Westin
Assistant Examiner—Stephone B. Allen
Attorney, Agent, or Firm—Augustus W. Winfield

[57] ABSTRACT

A completely passive adapter for scanning transparent images in a reflective scanner. Mirrors are used to capture light from a lamp that is internal to the scanner and to reflect that light thought a transparent image along the light path required by internal scanner optics. For larger images, a lens is added to capture additional light. Different embodiments of the adapter accommodate variation in angles of optical paths and offset between the light source path and the light detection path. Embodiments are provided having two tilted mirrors, two mirrors plus an optical wedge, four mirrors, and seven mirrors. An optional graduated density optical filter may be added to compensate for nonuniform illumination.

35 Claims, 26 Drawing Sheets

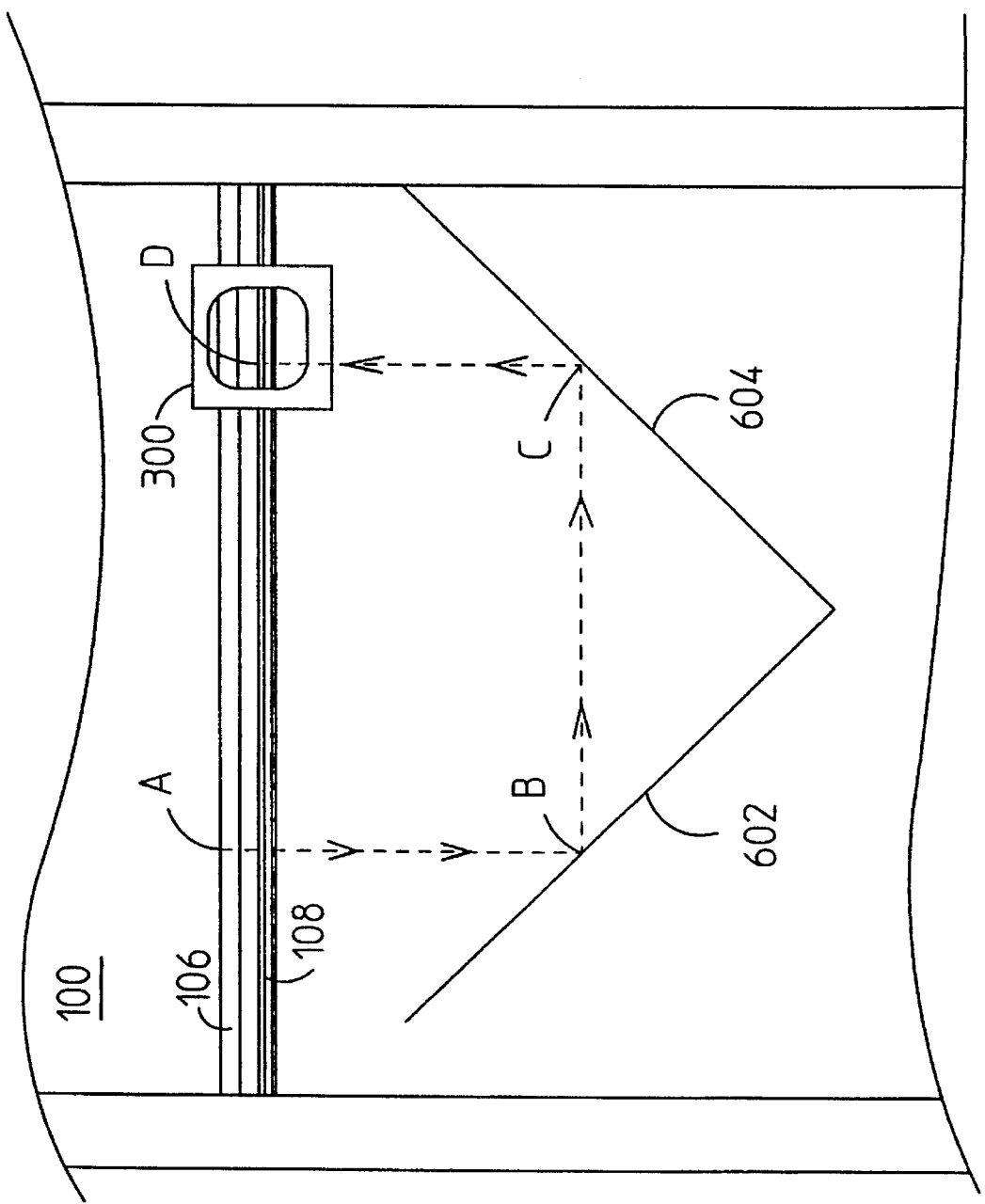

1

ADAPTER FOR SCANNING TRANSPARENCIES WITH A REFLECTIVE DOCUMENT SCANNER

This is a continuation-in-part of application Ser. No. 08/112,832 filed on Aug. 26, 1993, now abandoned.

FIELD OF INVENTION

This invention relates generally to optical scanners and more specifically to an adapter for scanning transparent images such as slides and negatives.

BACKGROUND OF THE INVENTION

A document scanner is a device which converts a visible image such as a photograph, transparency or printed paper into an electronic form suitable for copying, storing or processing by a computer. Reflective document scanners typically have a controlled source of light which is reflected off the surface of a document onto an array of photosensitive devices. The photosensitive devices convert received light intensity into an electronic signal. Transparency scanners pass light through a transparent image such as a photographic positive slide image and then onto an array of photosensitive devices.

A transparent image may be scanned in a reflective scanner by placing a white surface behind the transparency. In such an arrangement, light passes through the transparency to the white background, reflects off the white background and passes through the transparency a second time before impinging onto the photosensitive devices. Therefore, light is filtered twice by the transparent image. In general, this double filtering creams an unacceptable distortion of gray scale, color, contrast and other image characteristics.

Reflective document scanners may be adapted to scan transparent images by providing a separate light source to back light the image so that the light passes through the transparency only once. In some systems, separate optics may be required to properly project the image onto the photosensitive devices. Motors may also be required to move the external light source relative to the image. There is a need for an adapter for scanning transparent images in a reflective document scanner in which the adapter is completely passive, with no separate light source and no moving parts, and in which light passes through the image only once.

SUMMARY OF THE INVENTION

The present invention provides a completely passive adapter for scanning transparent images in a reflective scanner. A light source in the reflective scanner provides light which passes outside the area of the transparent image. The adapter captures light which passes outside the area of the transparent image and reflects the light through the transparent image. The reflected light reenters the scanner along the optical path required by scanner internal optics. An example embodiment for small transparent images uses four mirrors to provide light along the required optical path. An example embodiment for larger transparent images adds a lens to capture light over a wider area. Additional embodiments include an adapter having seven mirrors to provide more uniform light, an adapter with two mirrors plus an optical wedge (and an optional lens), an adapter having a tilted two-mirror system (and an optional lens), and finally, a low cost foldable adapter. In each of the embodiments, a graduated optical filter may be added to compensate for nonuniformity of light.

BRIEF DESCRIPTION OF THE DRAWINGS

FIG. 6A is a mechanical partial top view of a reflective scanner with an adapter for transparent images in accordance with one embodiment of the present invention.

DETAILED DESCRIPTION OF THE PREFERRED EMBODIMENT OF THE INVENTION

Figure 1:
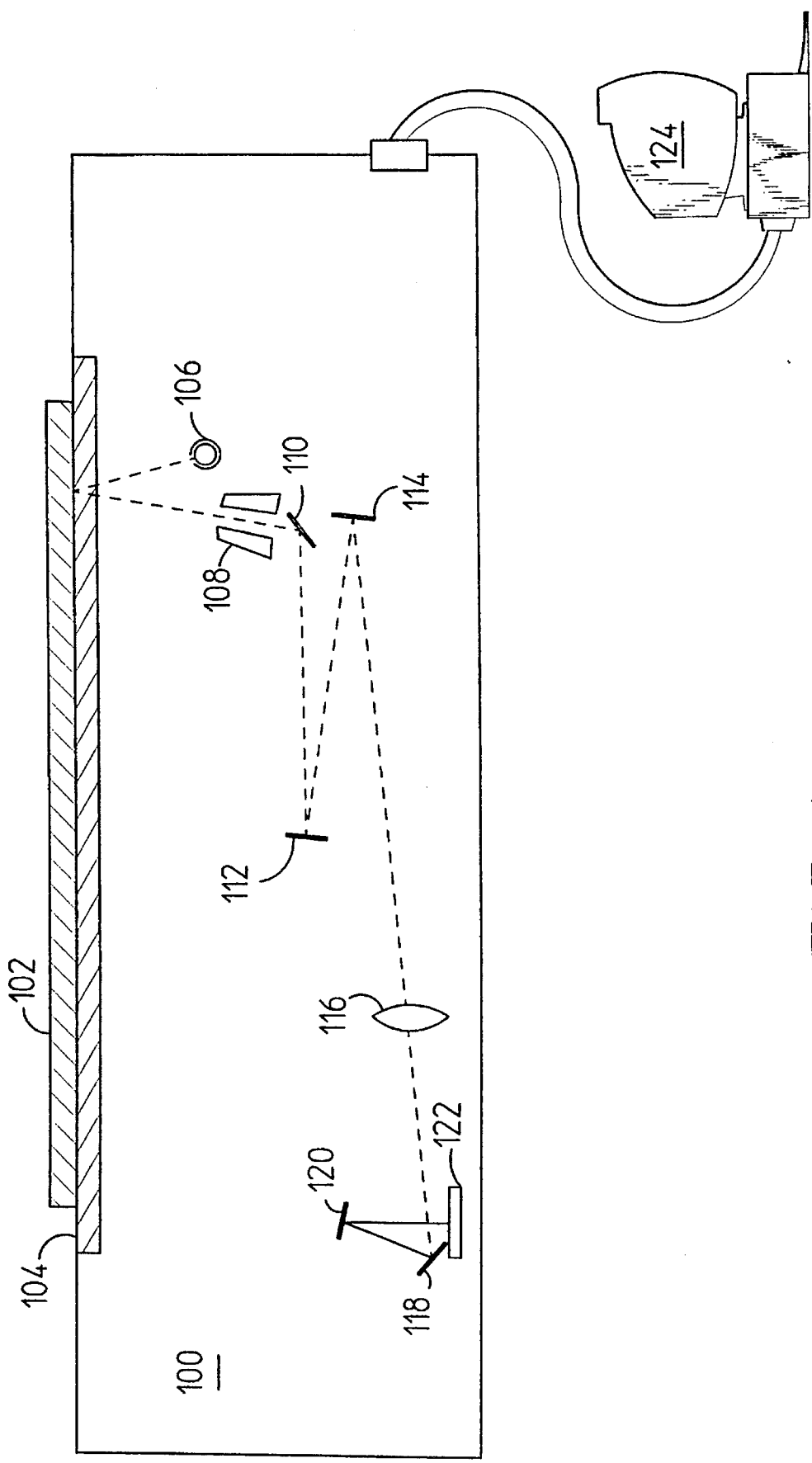
FIG. 1 is a mechanical side view of a reflective scanner.

FIG. 1 is a block diagram illustration of a side view of a reflective document scanner. Document scanner 100 has an opaque document 102 lying face down on a transparent platen 104. A lamp 106 projects a band of light onto the face of the document 102. The document 102 reflects light over a relatively wide range of angles. A lens 116 has a focal point (actually a line) at the surface of the document 102 which defines a very narrow optical path of light which reaches an array of photosensors 122. That is, only light from a very restricted portion of the document and only light from a very restricted angle of reflection from the image reaches the array of photosensors. In addition, a field stop 108 may be used to further restrict the light path. In general, the focal length of the lens 116 is longer than the inside of the scanner so that the reflected light passes though a folded path of mirrors (110, 112 and 114) before reaching the photosensor array 122. In the configuration illustrated in FIG. 1, mirrors 118 and 120 have dichroic surfaces which provide color separation. In the configuration illustrated in FIG. 1, the lamp, mirrors, lens and photosensors are rigidly attached to one mechanical assembly. The entire assembly moves, parallel to the platen 104, to provide a moving band of light along the stationary document 102 for detection by the photosensor array 122. In other configurations the document may move past a stationary light source. The photosensor array 122 converts light into an electrical signal for image data to a printer (not illustrated) for copying or to a computer 124.

Figure 2:
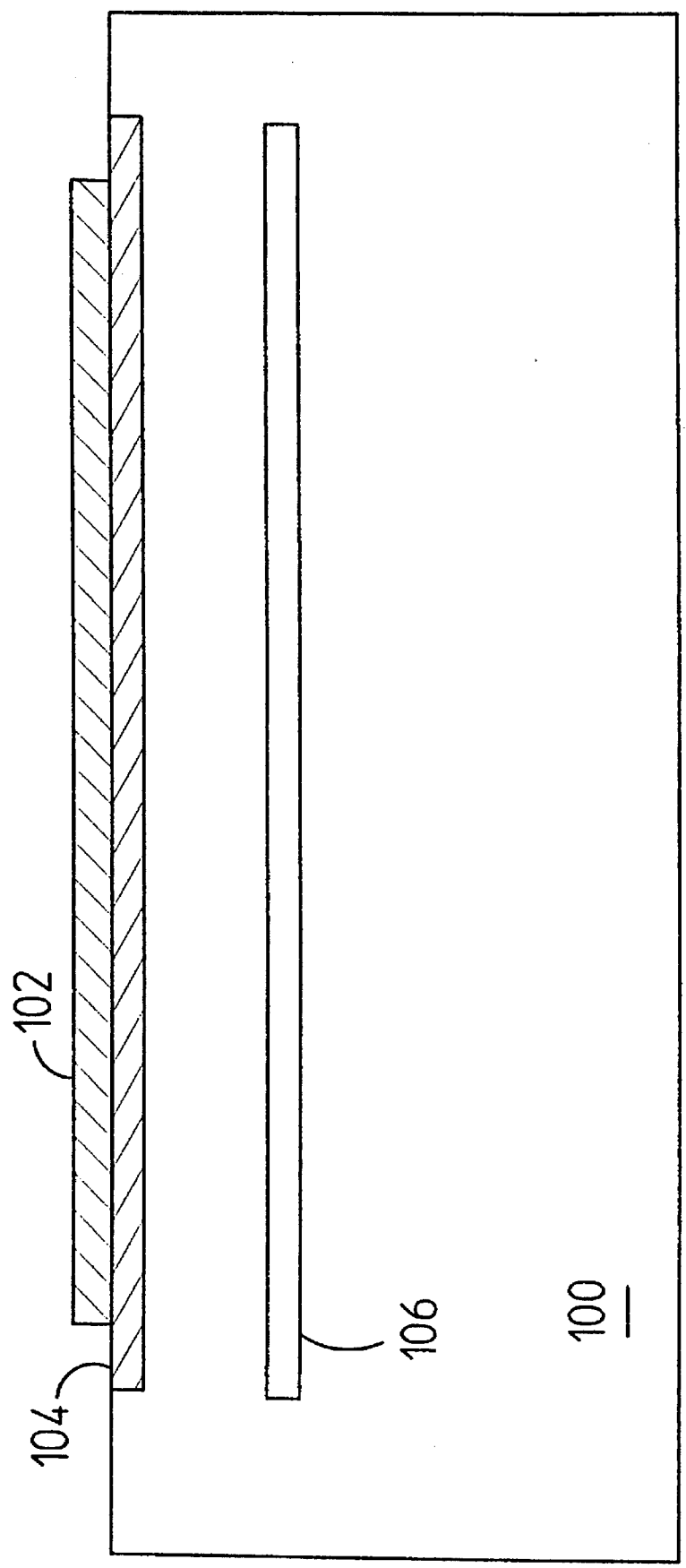
FIG. 2 is a mechanical end view of the reflective scanner of FIG. 1.

FIG. 2 illustrates an end view of the scanner illustrated in FIG. 1. As illustrated in FIG. 2, lamp 106 is typically a long cylinder such as a fluorescent tube, extending beyond the edges of document 102.

Figure 3:
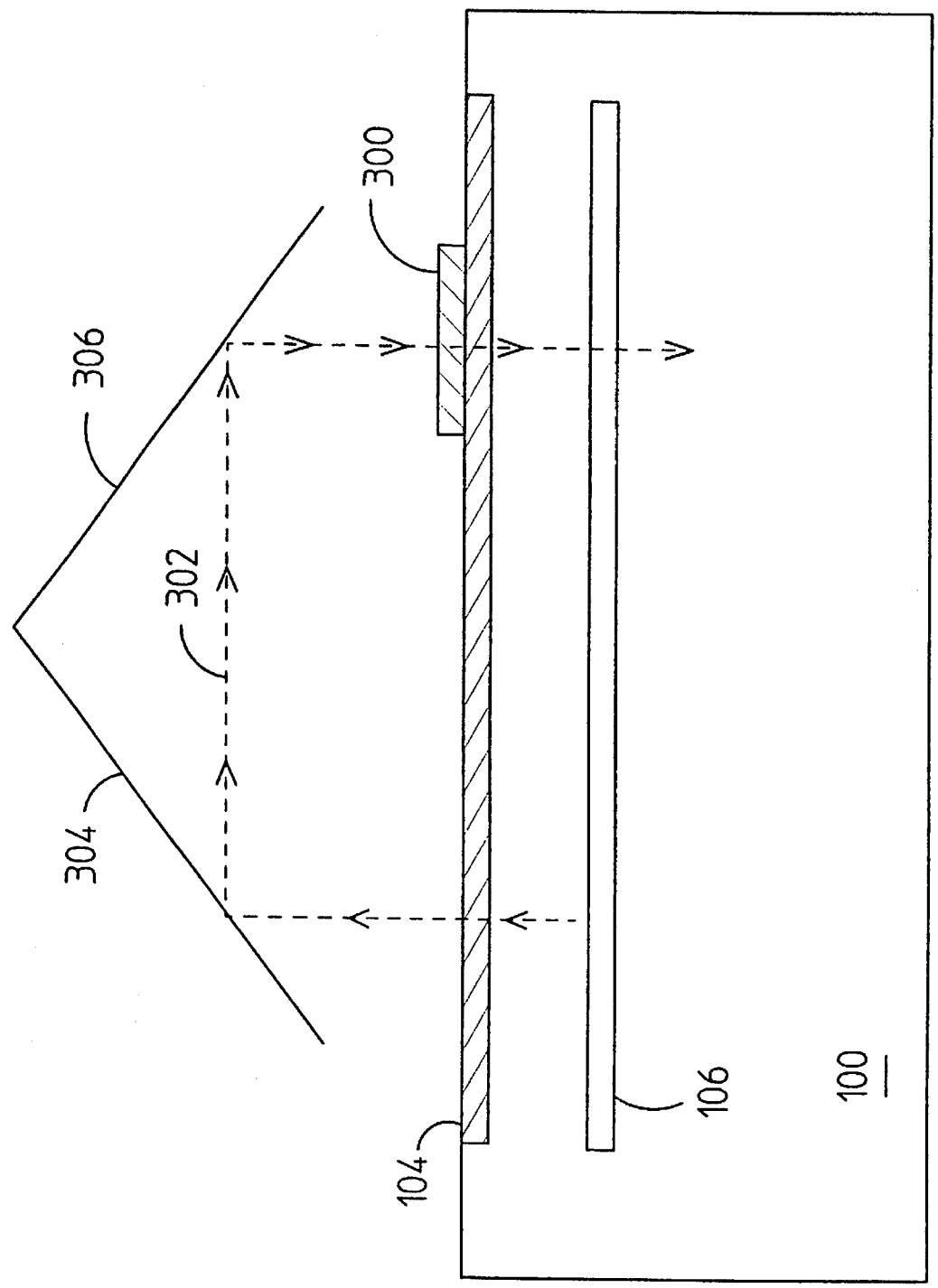
FIG. 3 is a mechanical end view of a reflective scanner with reflecting mirrors for a transparent image.

FIG. 3 illustrates an end view of the scanner as illustrated in FIG. 2 but in FIG. 3, the document is a transparent image 300. The goal of the present invention is to capture light from the internal scanner lamp 106 that is outside the area of the transparent image and to reflect that light through the back of the transparent image as illustrated by the dashed line 302. As will be discussed in further detail below, the dashed lined 302 in FIG. 3 illustrates the concept of redirecting light, but in general, a more complex arrangement of mirrors is required. In FIG. 3, light outside the image area is directed through the back of the transparent image. Note that it is possible to do the reverse. That is, light could pass through the front of the image following a path opposite to that illustrated in FIG. 3 and reach the photosensor array 122. However, the focal point for the scanner internal optics is at the surface of the opaque document. An arrangement directing light through the front of the image moves the image relative to internal optics (for example, focus lens 116 in FIG. 1). Therefore, additional external optics would be required. Directing the light through the back of the image as in the present invention leaves the image at the proper focal point relative to the internal optics of the scanner. In addition, directing the light before the light passes through the transparent image enables use of relatively low cost mirrors. The surfaces of the mirrors are not required to be optically precise.

If a framed photograph with a glass cover is illuminated with a single light source, at certain viewing angles the photographic image cannot seen because most of the light is reflected off the glass rather than off the image. Light reflecting off the underlying image, however, is diffuse and may be viewed over a wide range of angles. Specular reflections can be avoided by simply viewing the image at an angle where there are no direct reflections. Similarly, at certain angles of reflection, a document with a glossy surface such as a glossy photograph may reflect light in a mirror-like manner. Therefore, in a reflective document scanner, the relative alignment of the light source and the optical path is designed so that diffuse light is detected and directly reflected light is blocked from the optical path. The band of light impinging onto the face of the document is wide relative to the focal point of the lens and there is sufficient diffuse light reflected at the angle of the optical path defined by the lens. As a result, in a typical reflective document scanner, if the document is replaced by a mirror, no light will be reflected onto the sensors. The light source will not be at the focal point of the lens and the reflection off the mirror will not be at the precise angle required by the lens. For a transparent image, however, there is little scattering of light. The light must pass though the transparent image at precisely the angle required by the scanner's internal lens and optical path.

Referring back to FIG. 1, if the light source 106 and the field stop 108 are vertical to the platen 104 with no offset between the light source and the field stop, then a simple "tent" of two perpendicular mirrors as illustrated in FIG. 3 by lines 304 and 306 can provide the required light path. For example, in some facsimile machines and some hand-held scanners, the photosensors are arrays of solar cells in which the sensor array is essentially in contact with the image over the full width of the image. In scanners of that type, no internal scanner lenses or mirrors are necessary and for scanners of that type, a simple "tent" as illustrated in FIG. 1 may be all that is required for a transparency adapter. Therefore, the most simple embodiment of the present invention is two mirrors as represented by the lines 304 and 306 in FIG. 3. For example, a transparency may be placed onto a sheet of glass with a simple tent of two mirrors above the transparency and a hand held scanner may then be moved by hand along the lower surface of the glass. In general, however, for color scanners or gray scale scanners requiring high image accuracy (many bits per pixel), the photosensor array is typically an array of charged coupled devices (CCD). These scanners typically require an internal lens system and the light source and light path is typically offset Specular reflections are avoided by making the internal light path at an angle different than the angle of incidence of the light onto the image. Typically, the internal light path is offset and vertical but may also be at a non-vertical angle that is different than the angle of incidence of the light onto the image. In general, as discussed below in conjunction with FIGS. 4, 5, 6A and 6B, a more complex mirror arrangement is required. "to provide both offset and the angle required by the internal optics of the scanner."

Figure 5:
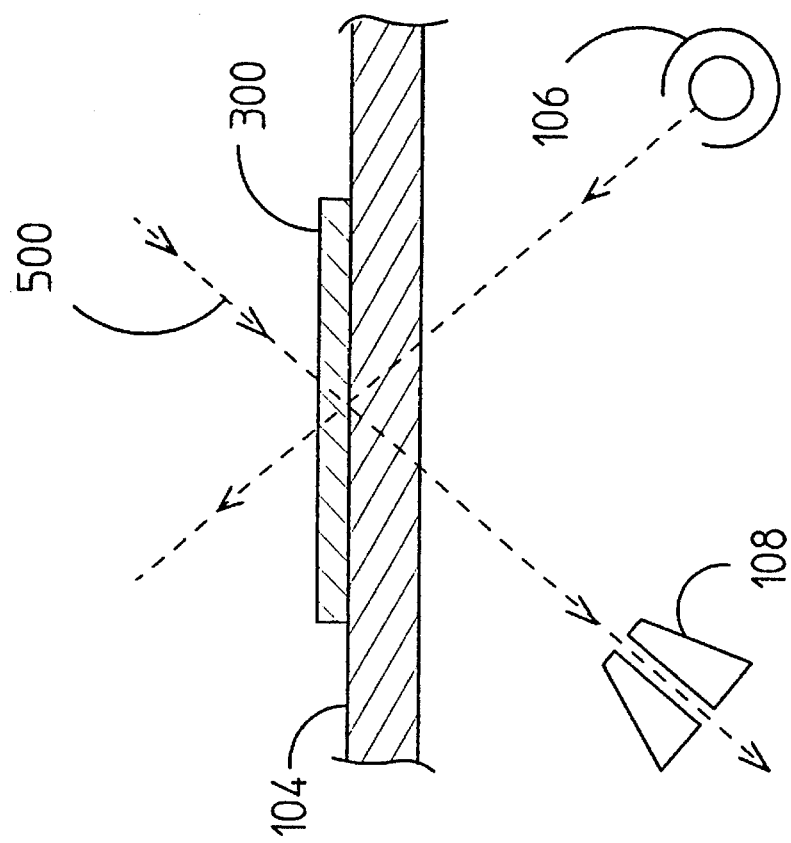
FIG. 5 is a mechanical partial side view of a reflective scanner with offset and non-vertical optical paths.
Figure 4:
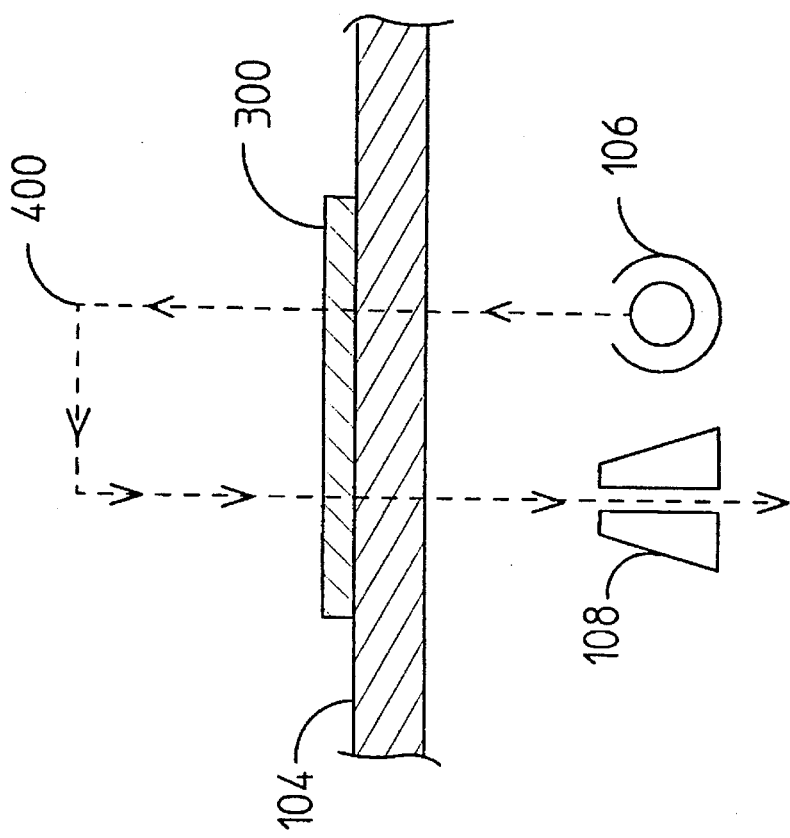
FIG. 4 is a mechanical partial side view of a reflective scanner with offset and vertical optical paths.
Figure 9:
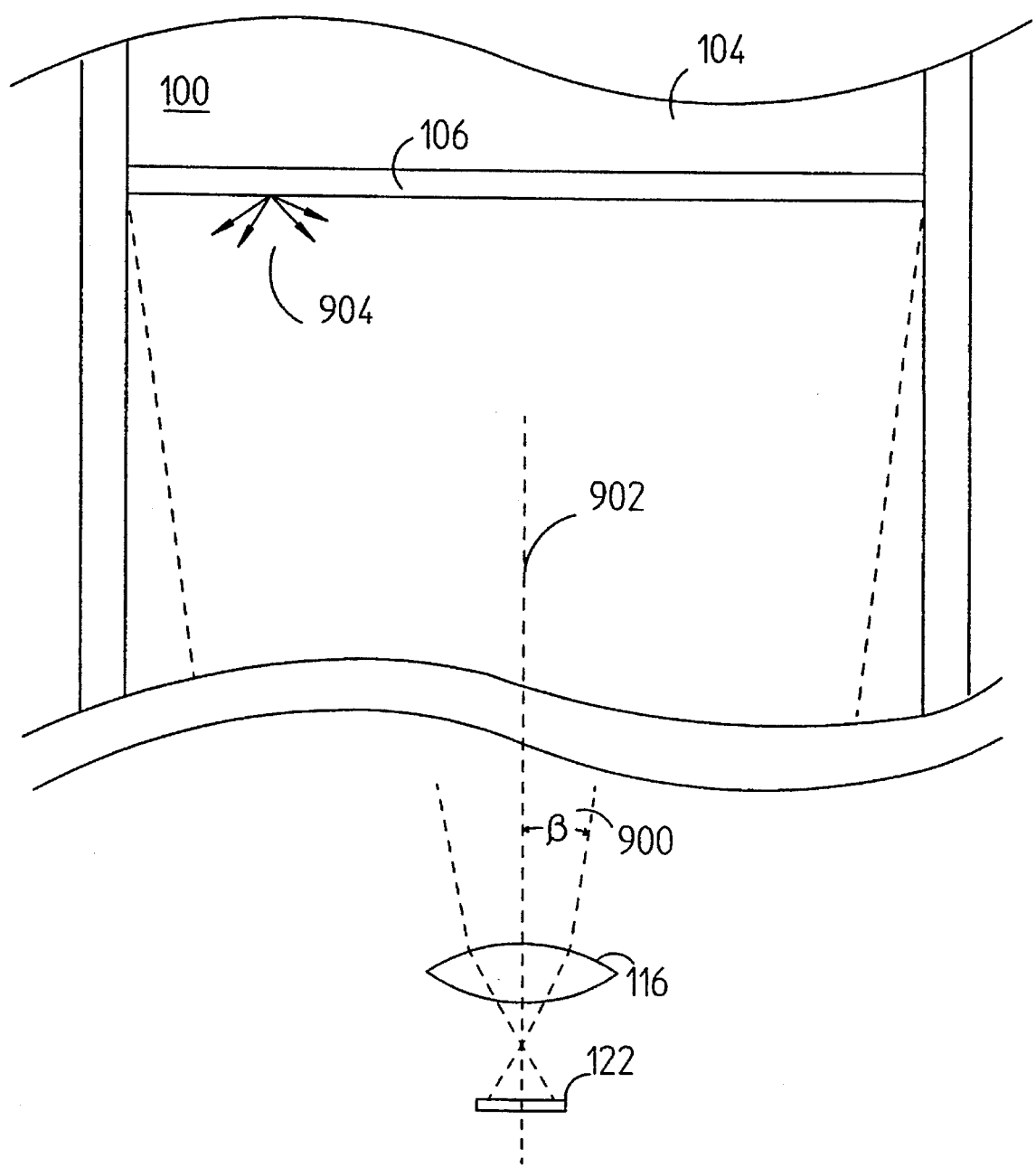
FIG. 9 is a mechanical partial top view of a reflective scanner illustrating an unfolded optical path.

The internal light path illustrated in FIG. 1 is only one example of an optical arrangement for a scanner. In general, there are numerous methods of folding, filtering and focusing light in a scanner. For all reflective scanners, however, there is a required path for light reflected from the opaque image. Some scanners may not have a field stop to suppress light from other angles but there is still an optimal angle. For purposes of the present invention, the primary internal light path parameters of importance are the angle of the light source relative to the document, the angle of reflected light relative to the document, and any offset between the light source path and the reflected light path. FIGS. 3, 4, 5 and 9 are simplified illustrations of various design parameters of interest. As an overview, FIG. 3 illustrates that light outside the image area is reflected across the width of the scanner; FIG. 4 illustrates an offset between the light source and the internal scanner optical path; FIG. 5 illustrates light at a non-vertical angle relative to the platen; and FIG. 9 illustrates an angle of the scanner's optical path defined by the width of the platen, the width of the photosensor array and the focal length of the lens.

FIGS. 4 and 5 illustrate partial side views of the scanner as illustrated in FIG. 1, with alternative embodiments of light paths. In FIG. 4, the lamp 106 directs light substantially vertically and the field stop 108 restricts returning light to light that is substantially vertical. The offset between the lamp 106 and the field stop 108 is typically on the order of 1 cm. Because a transparency does not diffuse light, the present invention is designed to precisely accommodate any offset between the lamp 106 and the field stop 108 (or the optical path defined by the lens even if there is no field stop) as illustrated by the dashed line 400 in FIG. 4. In FIG. 5, the lamp 106 directs light toward the document 300 at a non-vertical angle and the field stop 108 restricts returning light at a symmetrical non-vertical angle. The angles illustrated in FIG. 5 are exaggerated compared to a typical scanner arrangement. The present invention is also designed to precisely accommodate non-vertical light paths as illustrated by dashed line 500 in FIG. 5.

Figure 6B:
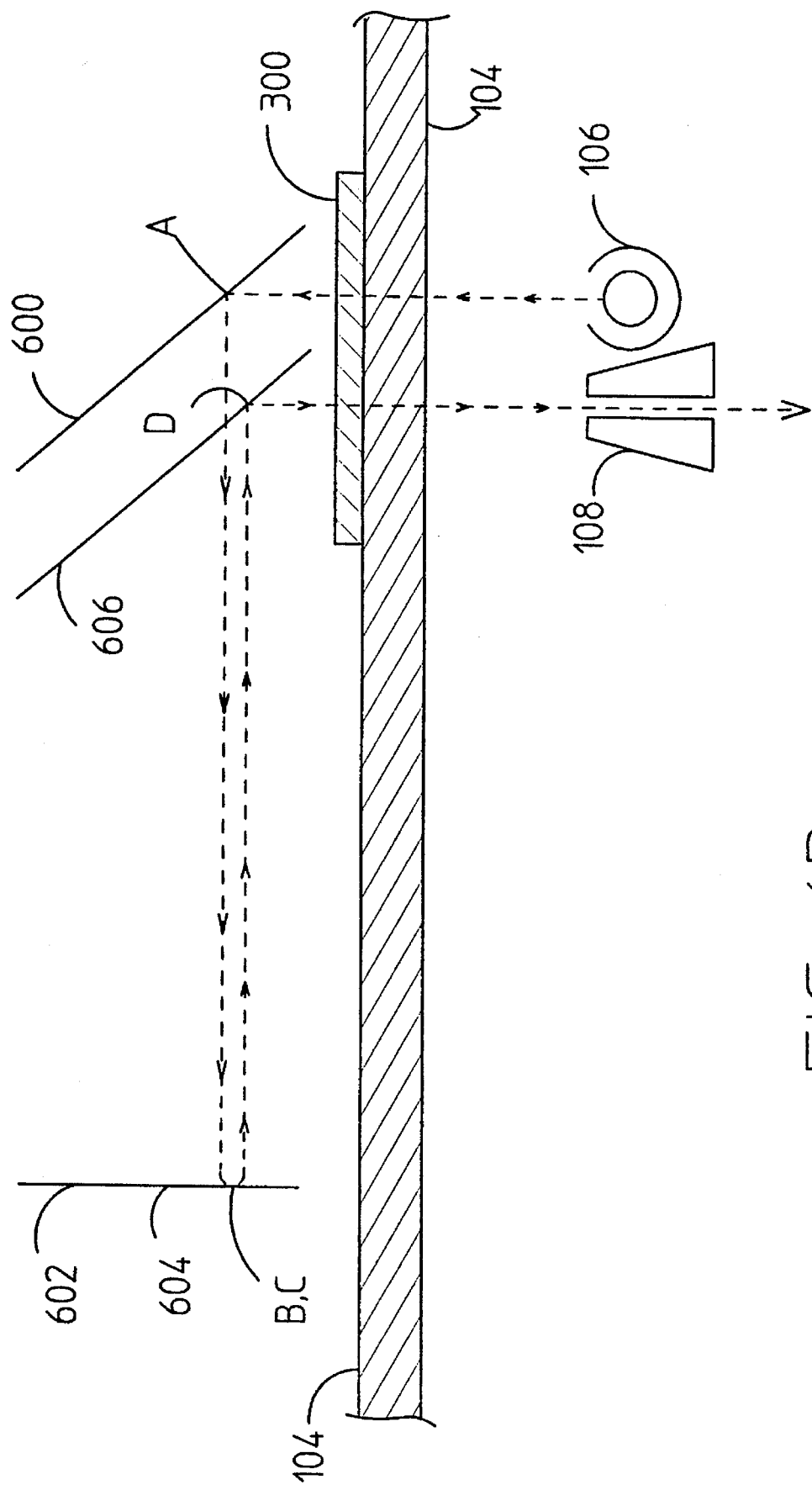
FIG. 6B is a mechanical partial side view of the reflective scanner and adapter of FIG. 6A.
Figure 7:
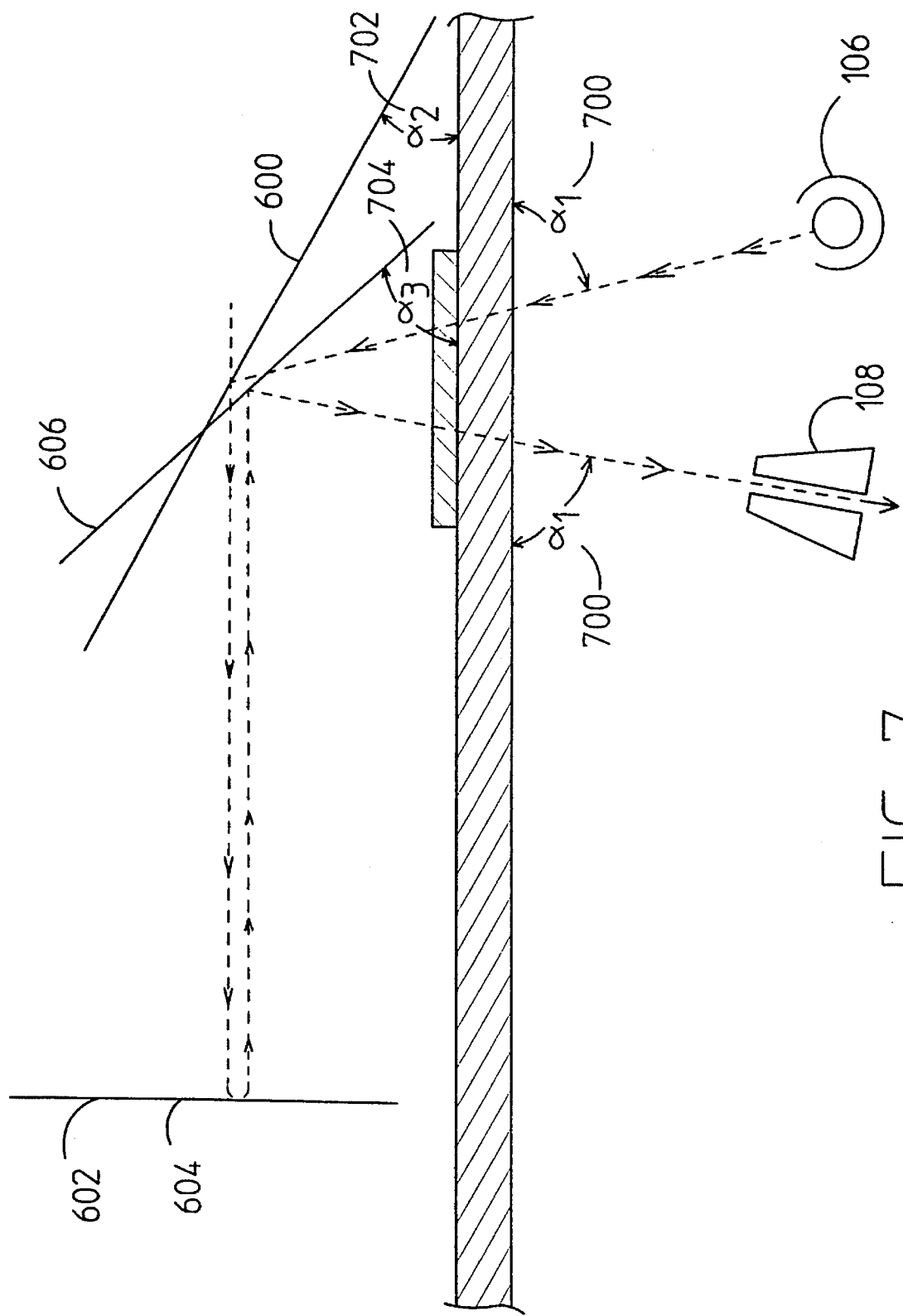
FIG. 7 is a mechanical partial side view of the reflective scanner and adapter with non-vertical light paths.

In each of the example embodiments of the present invention, an arrangement of mirrors is used to capture light outside the image area as illustrated in FIG. 3 and to direct that light through the back of the transparency at the proper offset and angle as illustrated in FIGS. 4 and 5. There are many alternative configurations of mirrors which can satisfy the requirements. FIG. 6A and 6B illustrate an embodiment of the present invention for vertical light with an offset as illustrated in FIG. 5. FIG. 7 illustrates a variation for non-vertical light with an offset.

FIG. 6A is a partial top view of the scanner 100 along with mirrors for transparency adaptation. FIG. 6B is a partial side view of the scanner 100 along with mirrors for transparency adaptation. As illustrated in FIGS. 6A and 6B, the light path is reflected four times for transparency adaptation. Light from the lamp 106 is first reflected at point A on mirror 600, second at point B on mirror 602, third at point C on mirror 604, and finally at point D on mirror 606 where it is reflected vertically through the field stop 108. For simplicity of illustration, mirrors 600 and 606 are not explicitly illustrated in FIG. 6A, and mirrors 602 and 604 are illustrated simply as a vertical line in FIG. 6B. Mirrors 602 and 604 are each perpendicular to the glass platen and perpendicular to each other, reflecting light across the width of the scanner as illustrated in FIG. 6A. For the configuration illustrated in FIGS. 6A and 6B, mirrors 600 and 606 are at 45° relative to the platen 104 and are offset an amount identical to the offset between the lamp 106 and the field stop 108.

Figure 8:
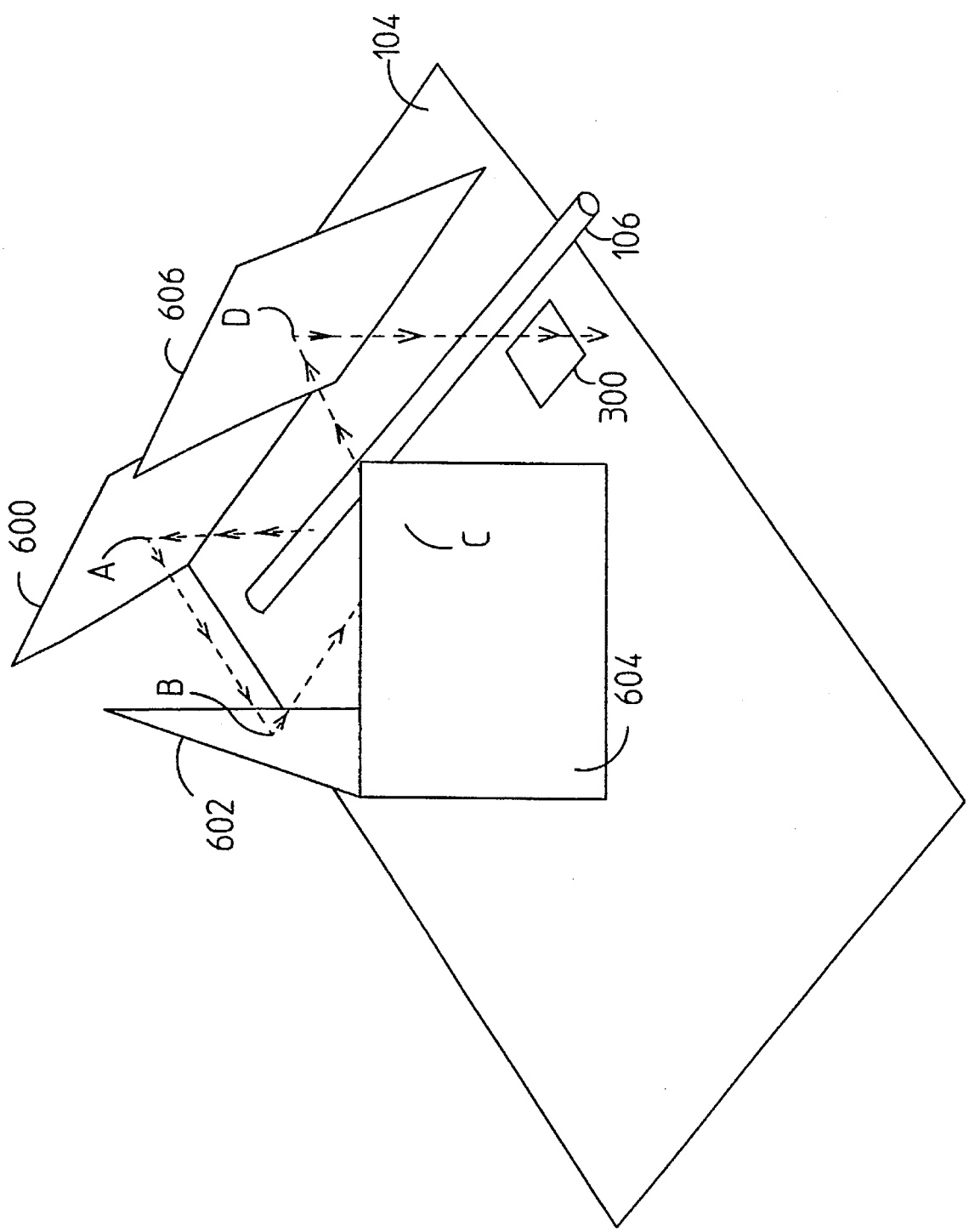
FIG. 8 is a mechanical perspective view of the scanner and adapter of FIGS. 6A, 6B and 7.

FIG. 7 illustrates a variation of the adapter of FIGS. 6A and 6B where the lamp and the field stop are not perpendicular to the platen and where it is also necessary to compensate for an offset between the lamp and field stop. In FIG. 7, the field stop 108 and lamp 106 are at an angle $\alpha_1$ (700) relative to the platen. In contrast to FIG. 6B, where mirrors 600 and 606 are at 45° relative to the platen, in FIG. 7, mirror 600 is at angle $\alpha_2 = \alpha_1/2$ (702) relative to the platen and mirror 606 is at an angle $\alpha_3 = 90° - \alpha_1/2$ (704) relative to the platen. In addition, in order to correctly fold the optical path, the spacing between mirrors 600 and 606 in FIG. 7 is not the same as the spacing between the field stop and the lamp. FIG. 8 is a perspective view of the four mirror configuration illustrated in FIGS. 6A, 6B and 7.

FIG. 9 illustrates a top view of the scanner 100 with the light path unfolded. As illustrated in FIG. 9, the width of the photosensor array 122, the width of the lamp 106, and the focal length of the lens 116 define an effective angle β (900) relative to the scanner center axis 902. The angle β is typically on the order of 5°–12°. In the plane of the light path (vertical in FIG. 4 or non-vertical in FIG. 5), the lamp 106 radiates light in all directions as illustrated by arrows 904 in FIG. 9. In general, for small transparent images using the mirror arrangements described above, there is sufficient light in each direction along the width of the image so that the angle β is not a significant design parameter.

Figure 10:
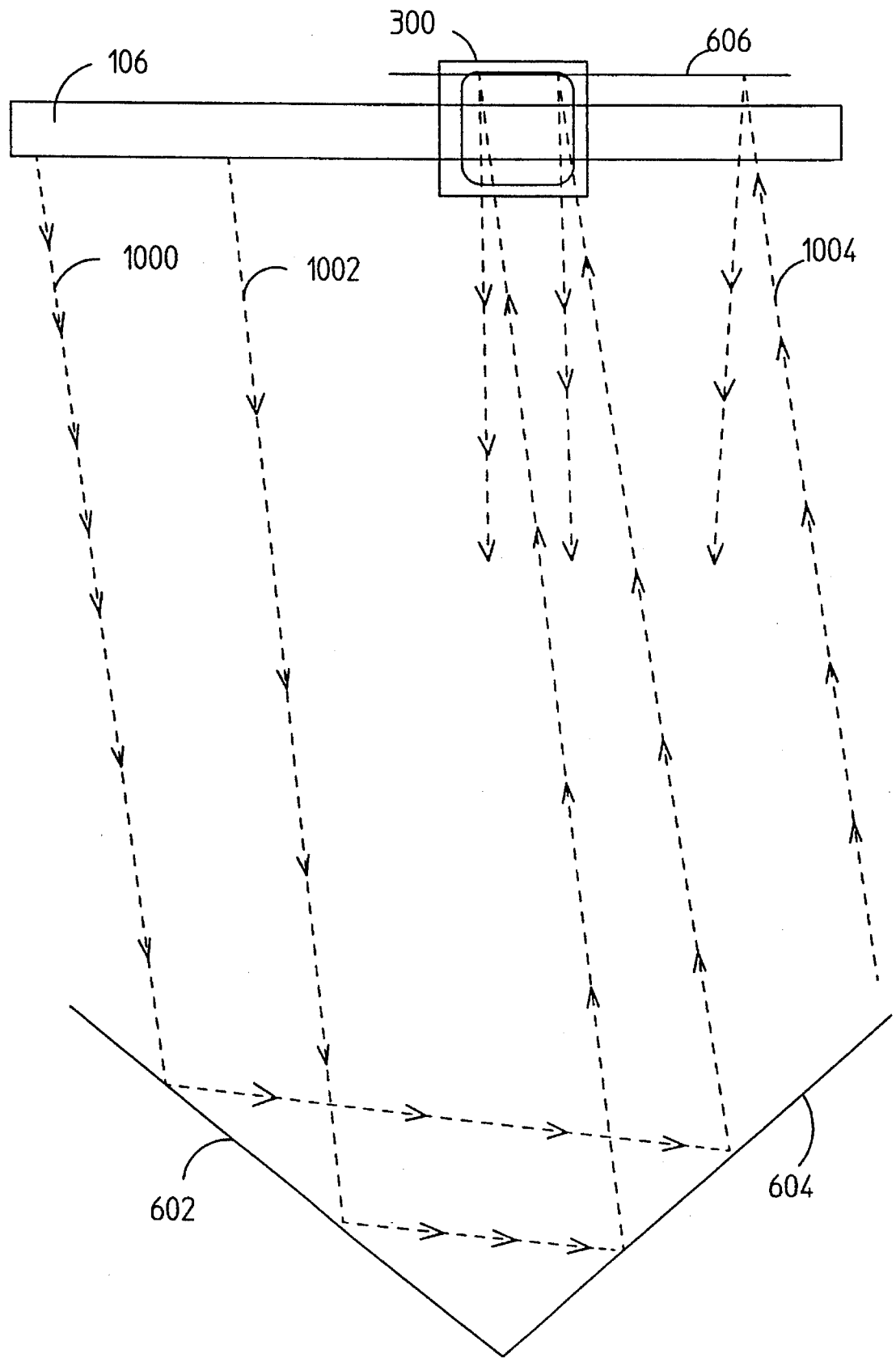
FIG. 10 is a mechanical partial top view of a reflective scanner with an adapter illustrating light ray paths for a transparent image in which all light rays are depicted as being in a horizontal plane.

FIG. 10 depicts a top view of a scanner with adapter mirrors illustrating light ray traces for a small transparent image. Dashed lines 1000 and 1002 illustrate light paths which originate at the lamp 106, reflect off mirrors 602 and 604 and reflect off mirror 606 (for simplicity, mirror 600 is not explicitly illustrated) at the proper angle to satisfy the requirements of convergence angle β as illustrated in FIG. 9. If the transparent image 300 is wider, the outside edge needs light rays as depicted by the dashed line 1004. As illustrated in FIG. 10, no light rays from the lamp 106 can satisfy the requirement for the outer edge of a large transparent image. A typical reflective scanner is designed to accommodate U.S. legal size paper (8.5 in by 14 in) or metric size A4 paper (210 mm by 297 mm). A common large format film size is approximately 102 mm by 127 mm (4 in by 5 in). Scanning a transparency of that film size using a reflective scanner with a legal size platen or an A4 size platen imposes additional requirements for light gathering and reflection.

Figure 11:
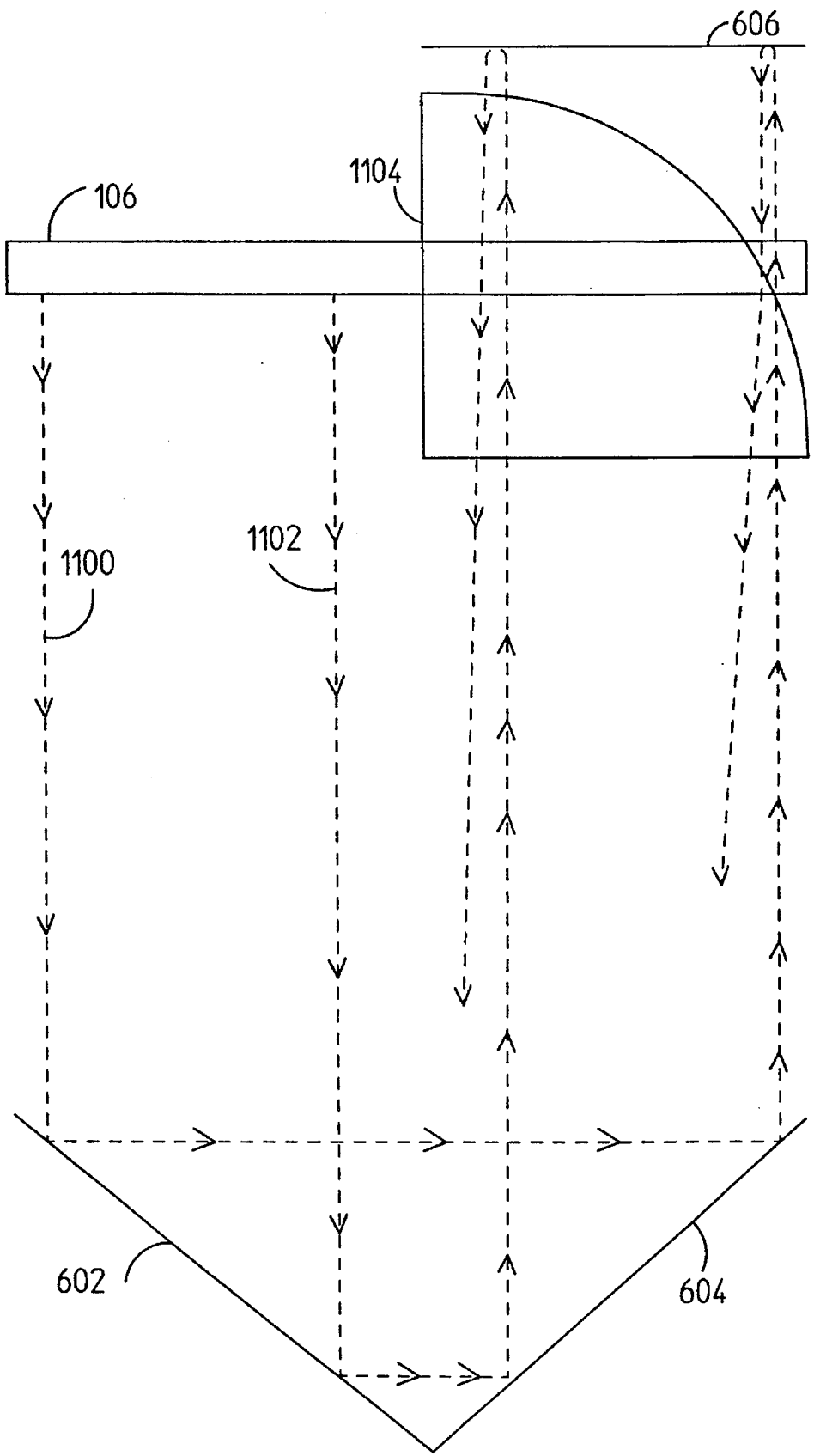
FIG. 11 is a mechanical partial top view of the reflective scanner and adapter of FIG. 10 with the addition of a lens to provide illumination at the proper angle for a transparent image in which all light rays are depicted as being in a horizontal plane.
Figure 12:
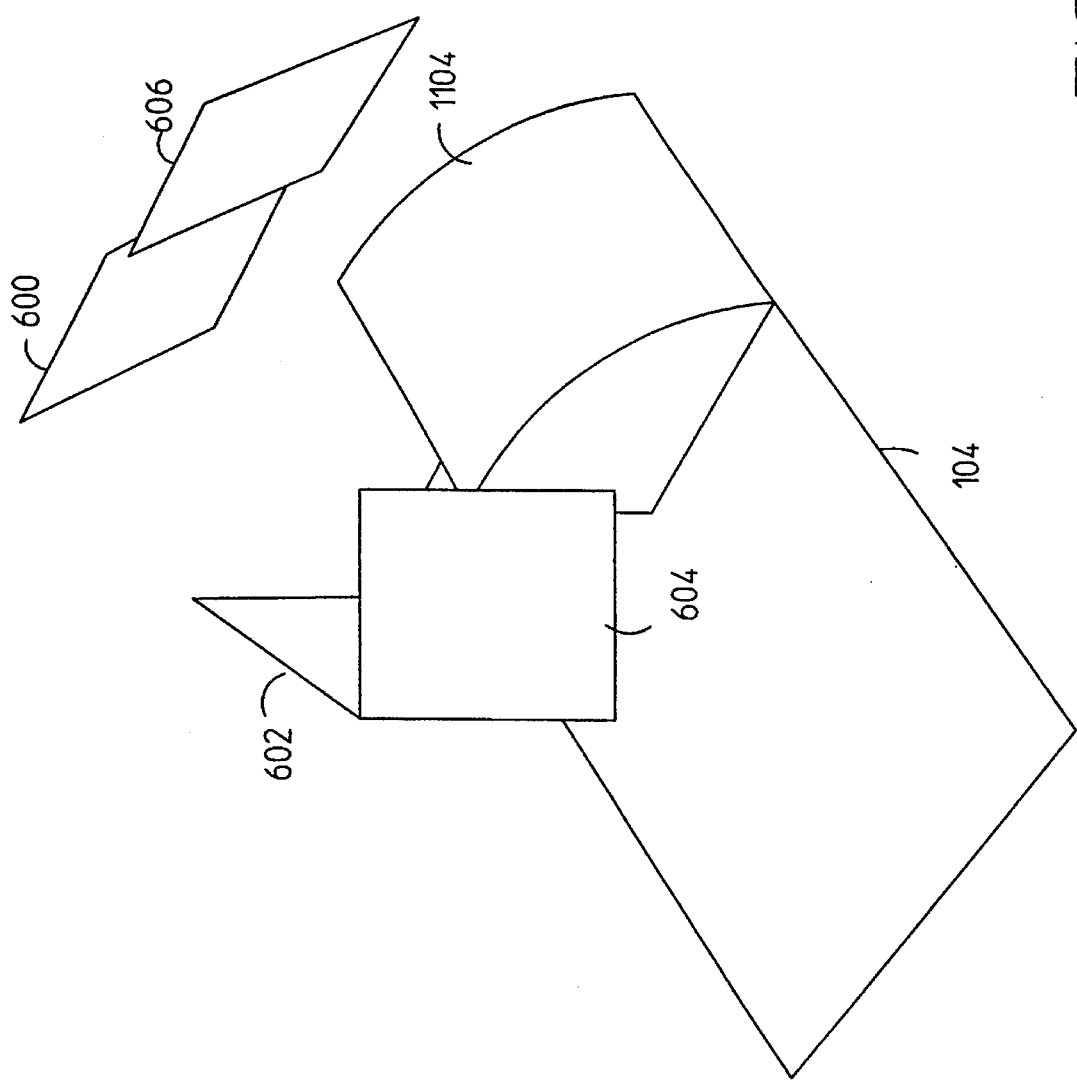
FIG. 12 is a mechanical perspective view of the adapter and lens configuration of FIG. 11.

FIG. 11 depicts a top view of a scanner with a lens 1104 to solve the problem illustrated by the light ray trace 1004 in FIG. 10 (for simplicity, all light rays are depicted as being in a horizontal plane). In FIG. 11, dashed lines 1100 and 1102 illustrate light paths perpendicular to the lamp 106, again reflecting off mirrors 602, 604 and 606. As illustrated in FIG. 11, before the light rays 1100 and 1102 reach the transparent image, they are deflected inward toward the center line of the scanner by the lens 1104. As in the discussion of mirror surfaces above, the lens 1104 is not required to be optically precise. As illustrated in FIG. 11, the lens 1104 may be a section of a low cost cylindrical lens. FIG. 12 illustrates a mechanical perspective view of the adapter with a lens as illustrated in FIG. 11.

Note that the adapters illustrated in FIGS. 3, 6A, 8 and 12 place the transparent image 300 near one edge of the platen. Depending on the scanner optics and light uniformity, a higher quality scan may be obtained if the transparent image is placed at the centerline (FIG. 9, 902) of the scanner. In particular, there is better uniformity of light at the center of a fluorescent tube than at the ends and there is better uniformity of light at the center of the internal lens (FIG. 1, 116) than at the edges of the lens. An embodiment is illustrated in FIGS. 13–15 that places the transparent image at the centerline of the scanner and gathers light from both sides of the transparent image.

Figure 13:
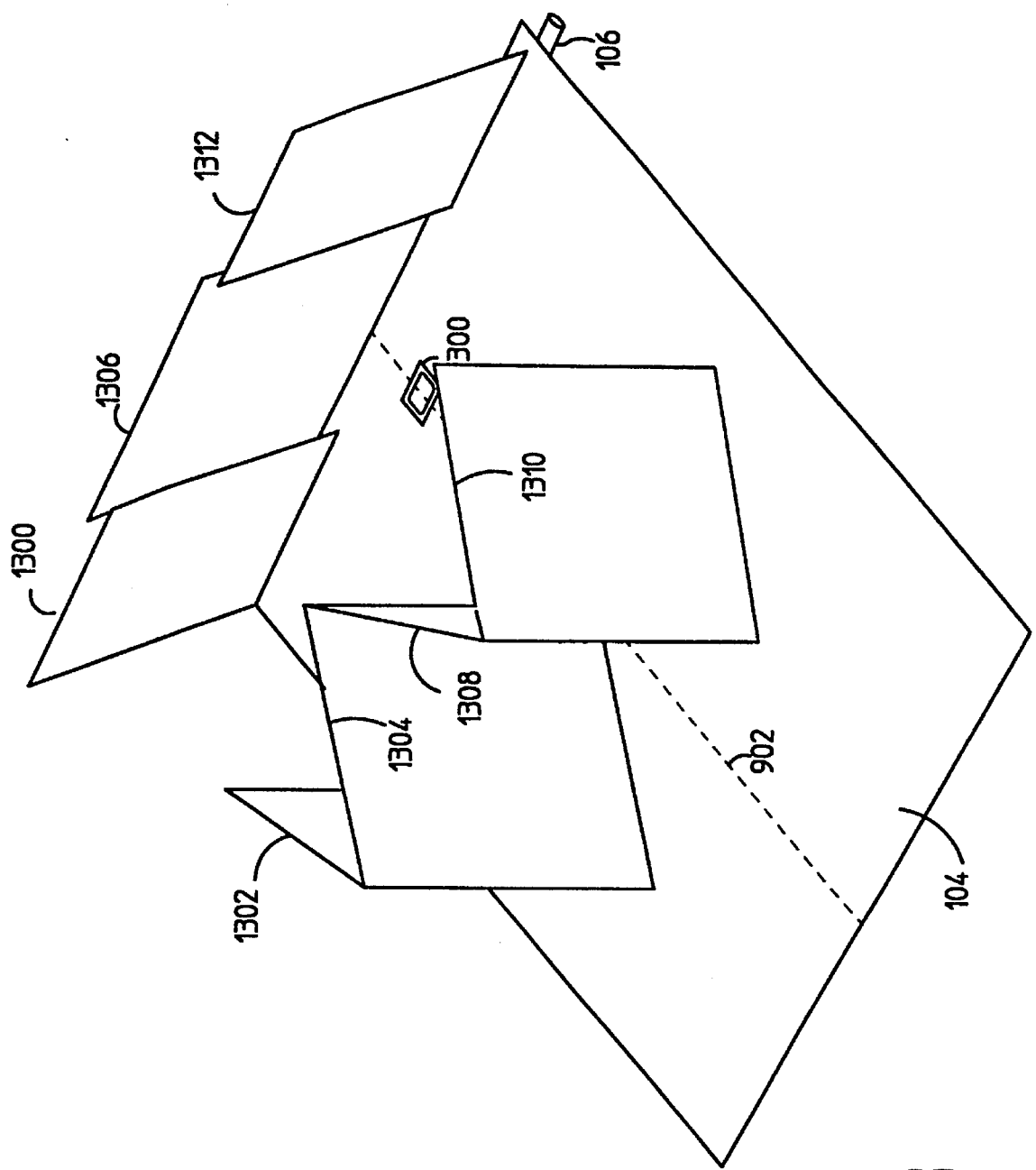
FIG. 13 is a mechanical perspective view of an adapter having seven mirrors.

FIG. 13 illustrates an adapter having seven mirrors. The arrangement in FIG. 13 may be viewed as two adapters as illustrated in FIG. 8, placed symmetrically on each side of the transparent image 300 with one mirror (1306) in common. That is, optically, mirrors 1300, 1302, 1304 and 1306 (FIG. 13) correspond to mirrors 600, 602, 604 and 606 (FIG.

12) respectively, and mirrors 1306, 1308, 1310, and 1312 (FIG. 13) correspond to mirrors 600, 602, 604 and 606 (FIG. 12) respectively. If the internal optical path is vertical as depicted in FIG. 6B, then mirrors 1300, 1306 and 1312 are all at an angle of 45° relative to the plane of the transparent image 300 (plane of the platen 104). If the internal optical path is at a non-vertical angle $\alpha_1$ as depicted in FIG. 7 (700), then mirrors 1300 and 1312 are at the angle $\alpha_1/2$ relative to the plane of the transparent image and mirror 1306 is at an angle of 90°–$\alpha/2$ relative to the plane of the transparent image.

Figure 14:
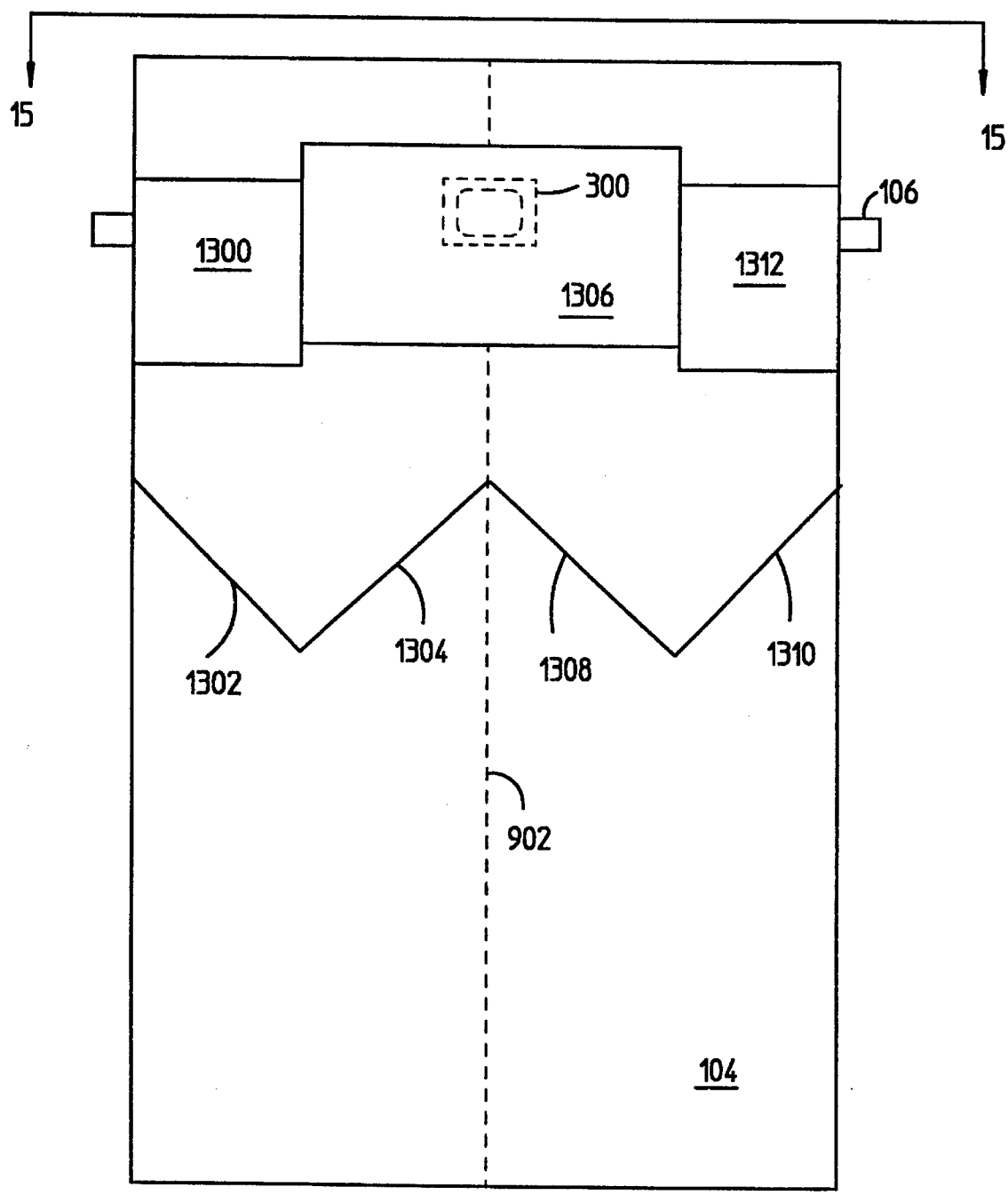
FIG. 14 is a mechanical top view of the adapter of FIG. 13.
Figure 15:
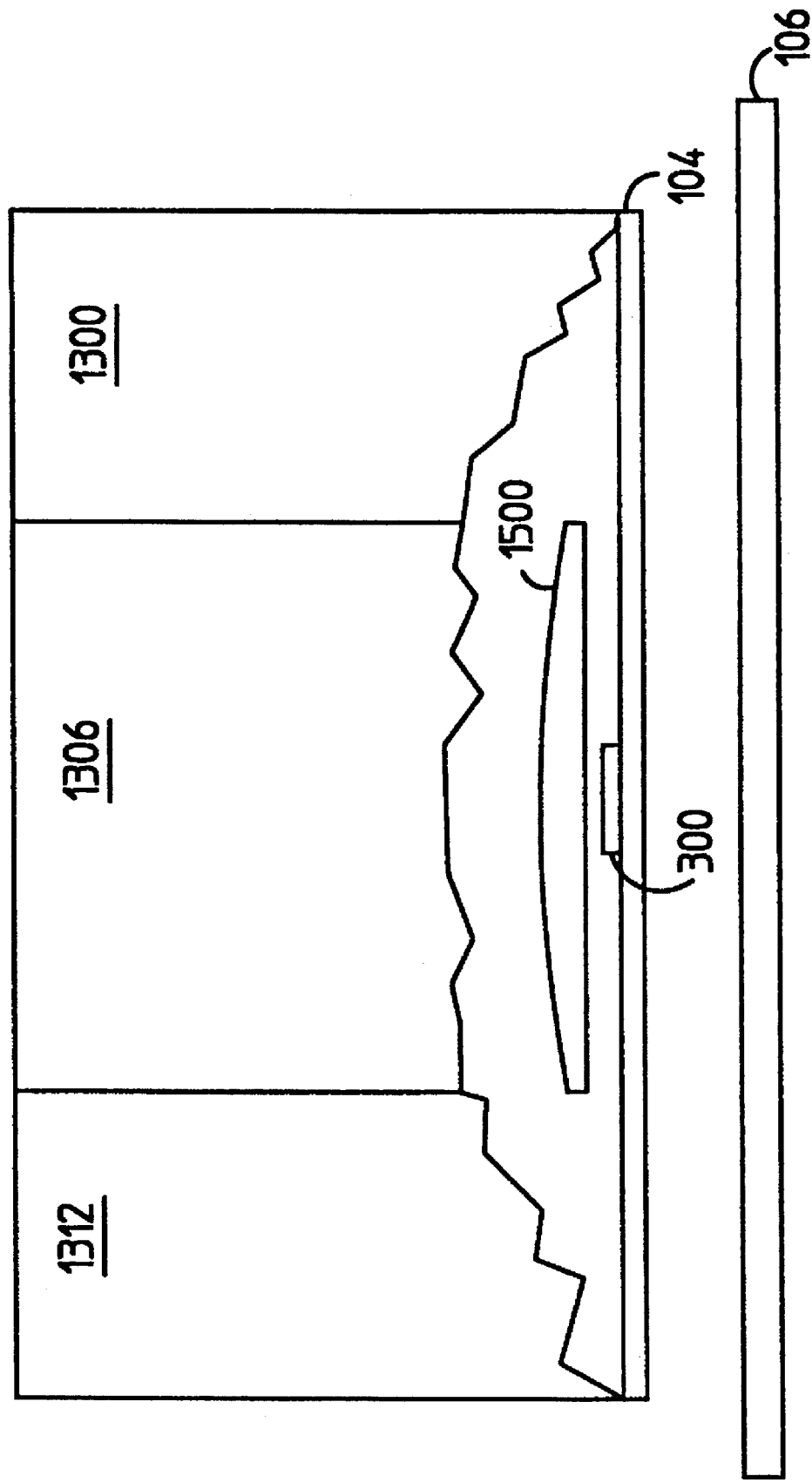
FIG. 15 is a mechanical end view of the adapter of FIG. 13.

FIG. 14 is a top view of the adapter of FIG. 13. As illustrated in FIG. 14, the transparent image 300 is placed along the scanner centerline 902 and light from the lamp 106 is gathered from both sides of the transparent image. With a diffuse light source as depicted by lines 904 in FIG. 9, the junction of mirrors 1304 and 1308 (FIGS. 13 and 14) does not have a substantial effect on the quality of the scanned image. That is, the junction is not visible in the scanned image. Note, however, that if mirrors 1304 and 1308 are not positioned accurately, then brightness over half the image may be different than brightness over the other half, creating an apparent brightness step along the center of the image. This brightness step can be minimized by accurate positioning of the mirrors.

FIG. 15 is an end view of the adapter of FIG. 13 with an optional lens 1500. The lens 1500 is not necessary for small transparencies (for example 35 mm) but enables use of larger images and better uniformity of light as illustrated in FIGS. 10 and 11.

Recall that the adapters illustrated in FIGS. 12 and 13 provide a solution to three general optical path requirements in addition to providing back lighting. The first general requirement is to accommodate offset between the light source and the internal light path as illustrated in FIG. 4. The second general requirement is to accommodate the angle of the internal light path relative to the plane of the image (platen) as illustrated in FIG. 7. The third requirement, primarily for large images or improved light uniformity, is to redirect divergent light to converge along the angle of the internal optical path relative to the centerline of the scanner, as required by an internal scanner lens, as illustrated in FIG. 9. Note that the simple tent arrangement of FIG. 3 provides offset for non-vertical light, but in general may not provide light at the angle required by internal scanner optics. However, as described below, two variations of the simple tent arrangement can provide offset along with any redirection required for an internal light path. In many commercially available scanners, the internal optical path of the scanner (as required by an internal scanner lens) is substantially vertical and offset as illustrated in FIG. 4. Therefore, the two-mirror variations below are illustrated for a vertical internal light path but may be easily adapted to provide light at any required angle.

Figure 16:
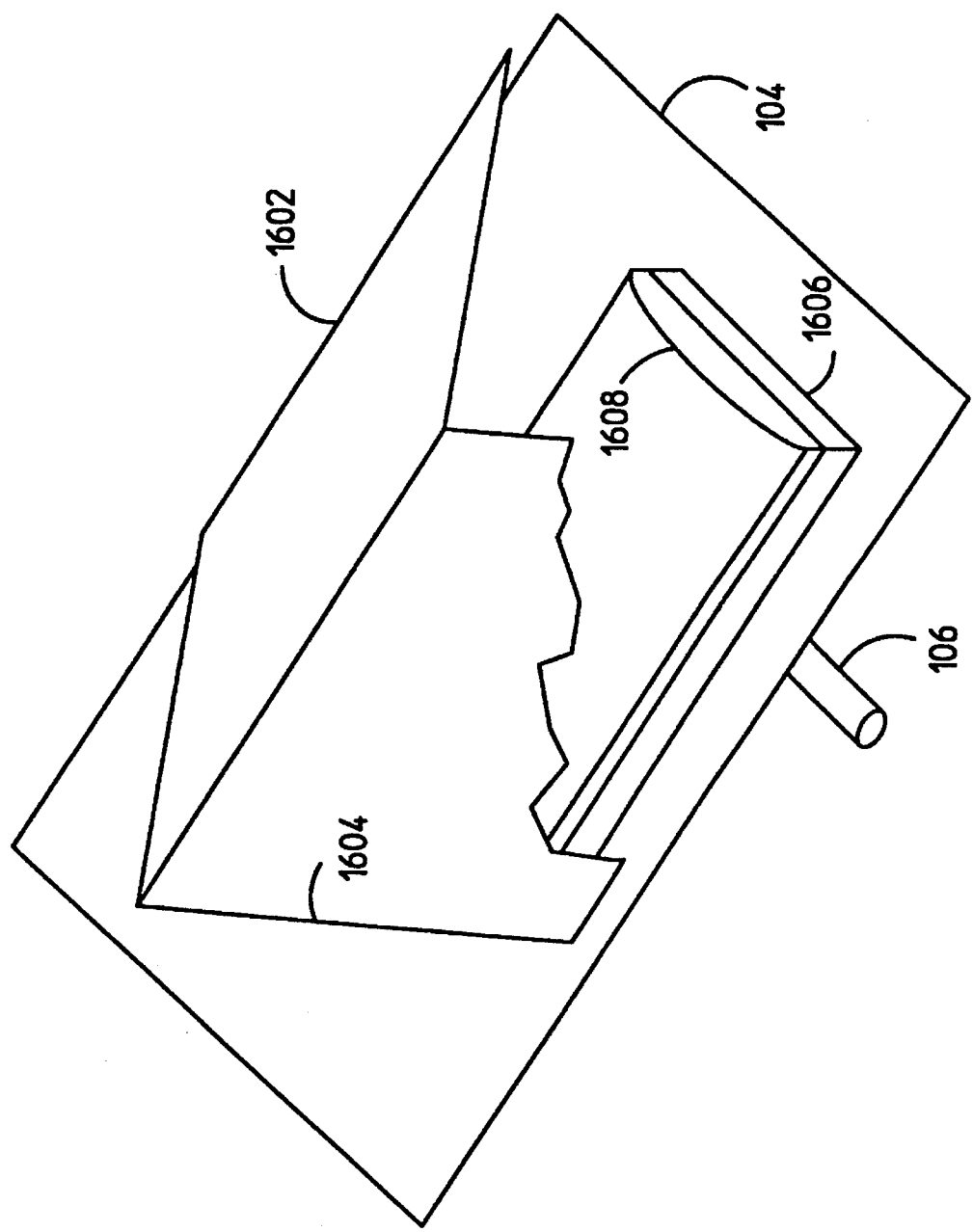
FIG. 16 is a mechanical perspective view of an adapter having two mirrors and a wedge-shaped lens.

FIG. 16 illustrates a two-mirror tent arrangement (1602, 1604) with an optical wedge 1606 and an optional lens 1608. The mirrors (1602, 1604) provide back lighting. The optical wedge 1606 redirects the light onto a vertical light path (or any other required angle) and ensures the proper offset. The lens 1608 redirects divergent light for large images and improved uniformity of light intensity.

Figure 17:
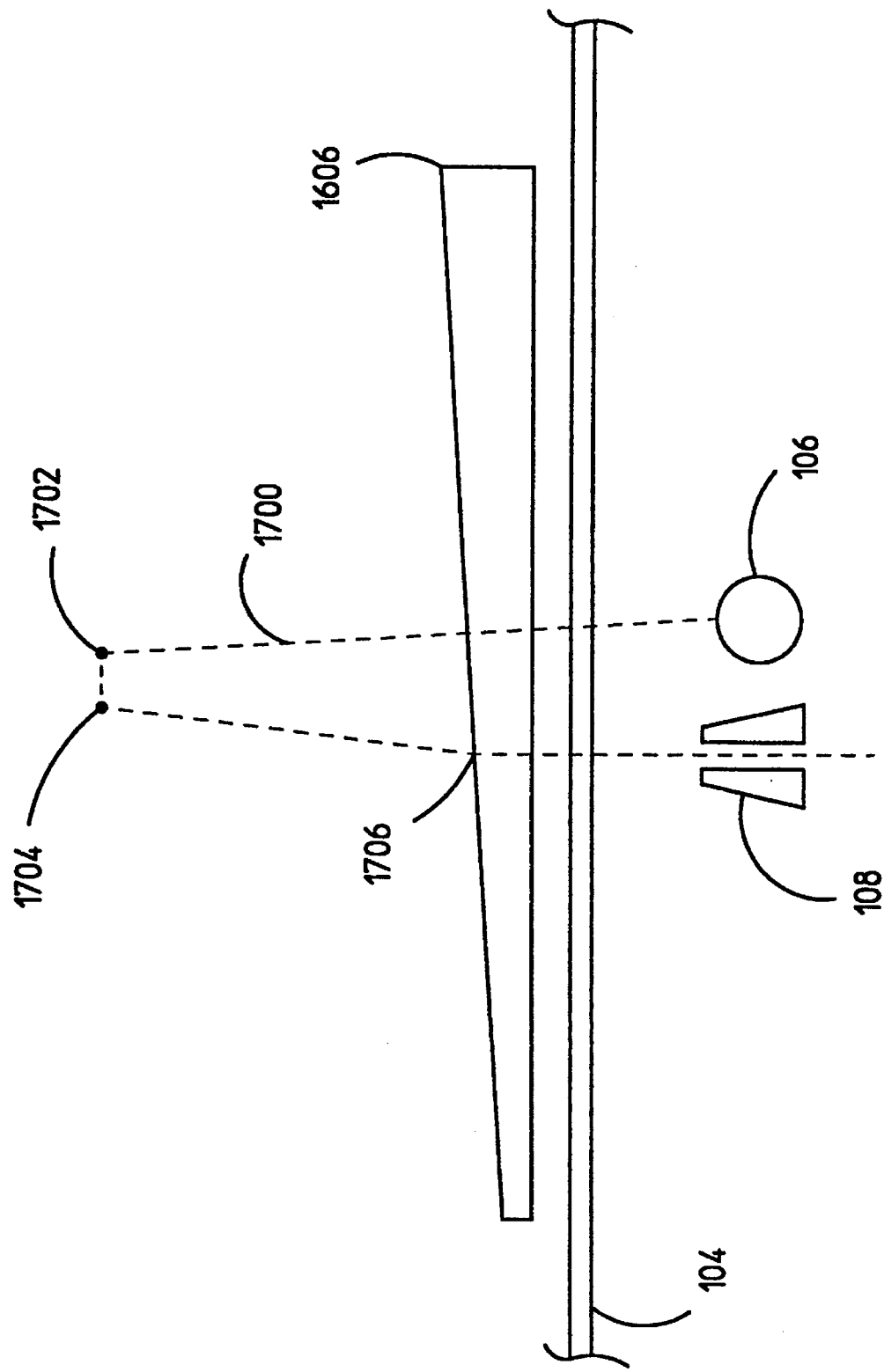
FIG. 17 is a mechanical side view of the adapter of FIG. 16.

FIG. 17 is a side view of the adapter of FIG. 16, illustrating in particular the shape of the optical wedge 1606. The slope of the wedge 1606 is exaggerated in FIG. 17 to facilitate illustration. Recall from the discussion of FIG. 1 that the lamp projects a band of light onto the lower surface of the platen 104. In FIG. 17, light ray 1700 is at a slight angle relative to the plane of the platen 104. In particular, light ray 1700 has a small directional component towards field stop 108. Light ray 1700 is reflected from mirror 1602 at point 1702. Light ray 1700 then continues across the scanner (with a small directional component towards field stop 108) from mirror 1602 to mirror 1604, reflecting from mirror 1604 at point 1704. At point 1706, the light ray 1700 is refracted by the optical wedge 1606 to be vertical relative to the plane of the platen 104 (vertical as viewed in FIG. 17 but not as viewed in FIG. 19), thereby entering the cone of visibility for the internal lens 116 (FIG. 1). With the wedge 1606, light rays at the proper initial angle to accommodate the offset are refracted (just before passing through the transparent image) to the angle required by the internal lens 116 (FIG. 1).

Figure 18:
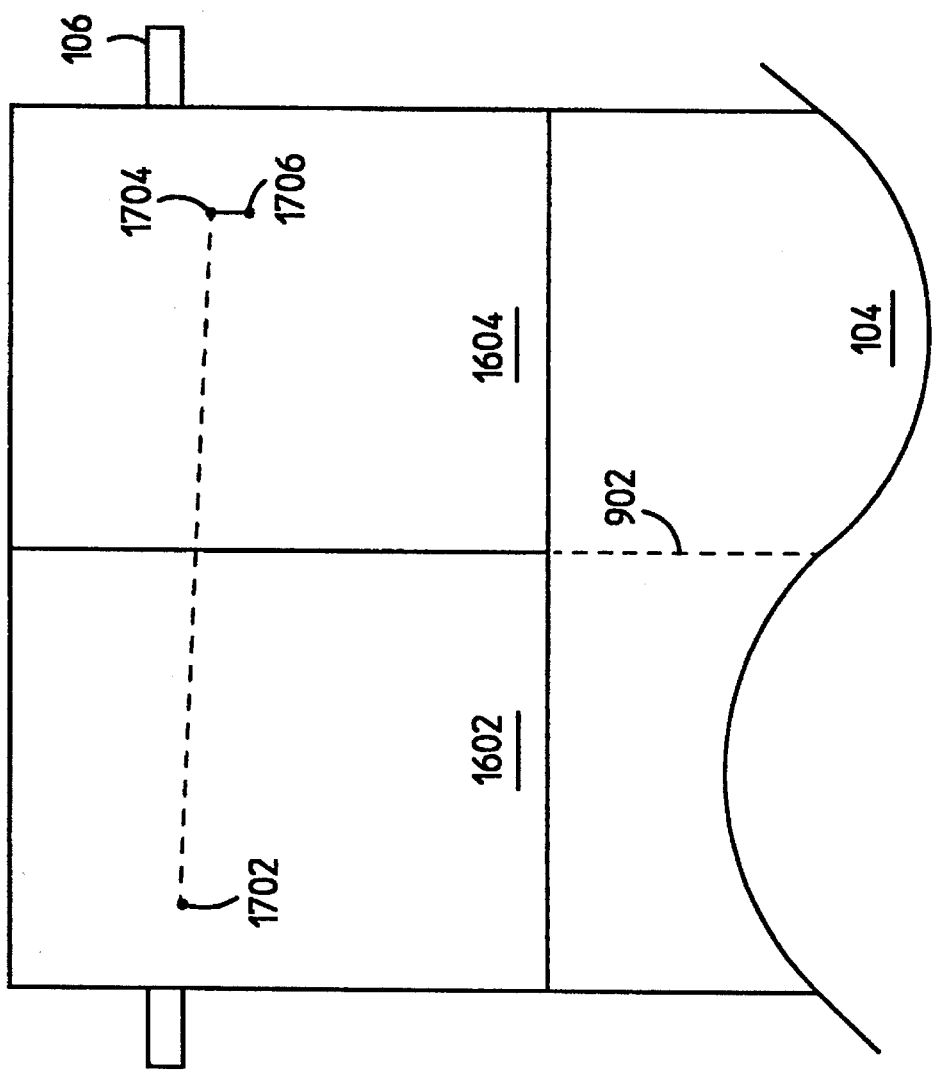
FIG. 18 is a mechanical top view of the adapter of FIG. 16.

FIG. 18 is a top view of the adapter of FIG. 16 illustrating the light ray 1700. The light ray 1700 leaves the lamp 106 with a directional component towards the bottom of the figure. The light ray 1700 is reflected off mirror 1602 at point 1702, along a path having a directional component towards the bottom of the figure, reflecting off mirror 1604 at point 1704, and entering the wedge 1606 at point 1706. When the light enters the wedge 1606, it is refracted to a vertical angle relative the plane of the platen 104. That is, there is no directional component parallel to the centerline 902, but there may be a horizontal component as illustrated in FIG. 19.

Figure 19:
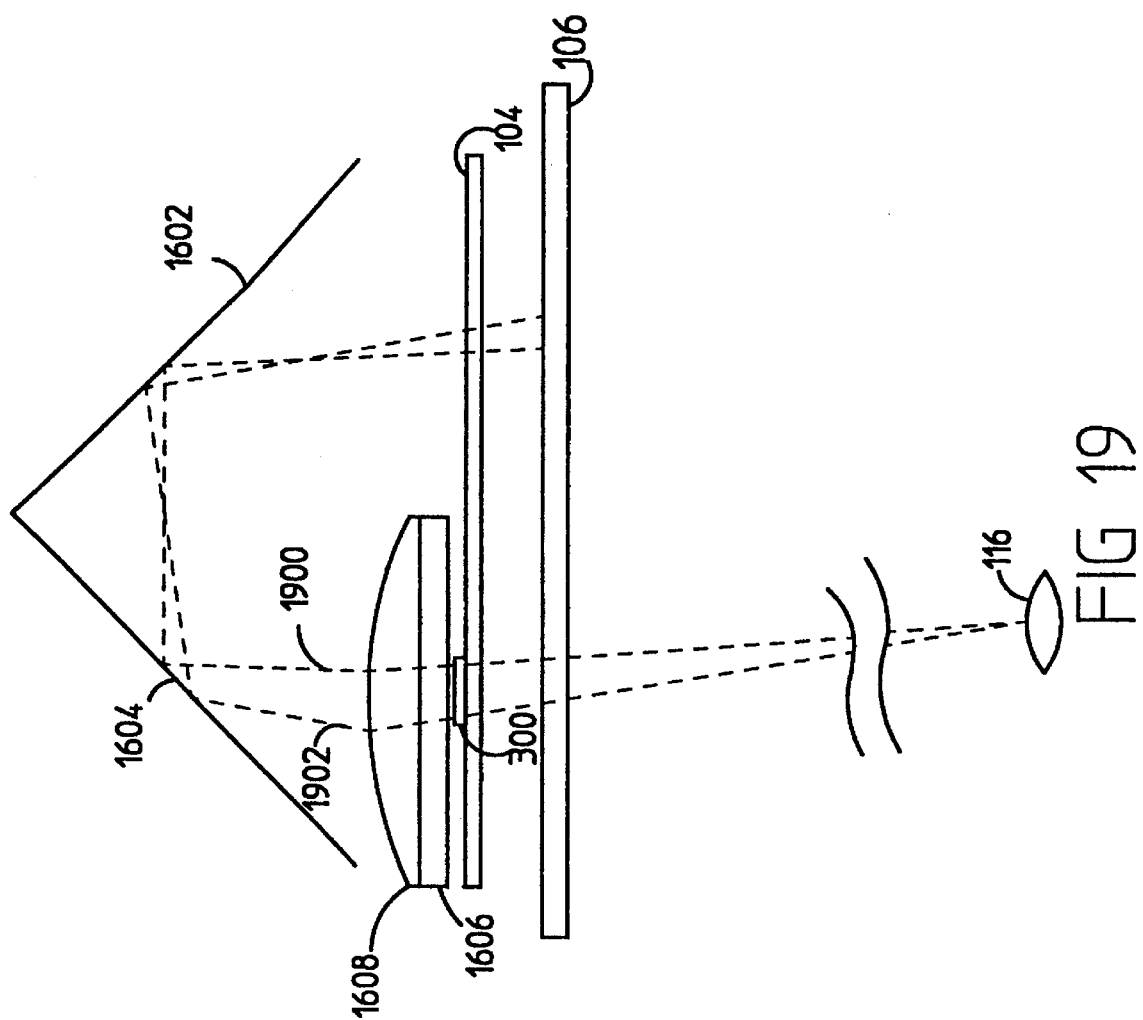
FIG. 19 is a mechanical end view of the adapter of FIG. 16.

FIG. 19 is an end view of the adapter of FIG. 16, illustrating the placement of the image 300 and the function and placement of the optional lens 1608. To facilitate illustration, the light paths in FIG. 19 approaching the internal lens 116 are depicted as being "unfolded." First, note that light paths 1900 and 1902 are diverging from the lamp 106. The lens 1608 refracts the divergent light paths 1900 and 1902 so that they converge through the image 300 onto the internal lens 116. Another way of viewing the effect of the external lens 1608 is to view the image 300 from the internal lens 116. Without the external lens 1608, some light paths passing from the internal lens through the image 300 would not touch the lamp 106. Therefore, the condensing lens 1608 "captures" light that but for lens 1608 would not pass through the image and through the internal lens 116. As discussed in conjunction with FIGS. 10 and 11, the condensing lens 1608 enables use of wider images than would be possible without the lens 1608, and also improves uniformity of light across the images.

Because of the right angle reflectors (1602 and 1604) light paths 1900 and 1902 are substantially the same length. Therefore, the total displacement (offset) as illustrated in FIG. 18 is the same for light paths 1900 and 1902. Referring back to FIG. 17, there is a slight difference in path length (and therefore offset) from one end of the image to the other end because of the slope of the upper surface of the optical wedge. The effect of the slope of the wedge on offset change along the length of the image is negligible.

In FIG. 19, the image 300 is illustrated as being placed off the centerline (FIG. 9, 902) of the scanner. As discussed in conjunction with FIGS. 13–15, a higher quality scan may be obtained if the transparent image is placed at the centerline. In the embodiment of FIGS. 16–19, this may be accomplished by reducing the size of the adapter (using smaller mirrors) so that the adapter can be placed toward one side of the scanner with the image 300 and lens 1608 centered over the centerline of the scanner.

In the embodiment illustrated in FIGS. 16–19, offset between the lamp and the field stop is obtained through use of light rays that are non-vertical and the critical reentry angle is obtained by use of an optical wedge. In the two-mirror embodiments of FIG. 3 and FIGS. 16–19, the angle between the planes of the two mirrors is 90° and the line where the two planes intersect is parallel to the plane of the platen (note that the mirrors do not have to be joined). The proper reentry angle may also be obtained in a two-mirror arrangement by tilting the mirrors so that the line where the two planes intersect is not parallel to the plane of the platen.

Figure 20:
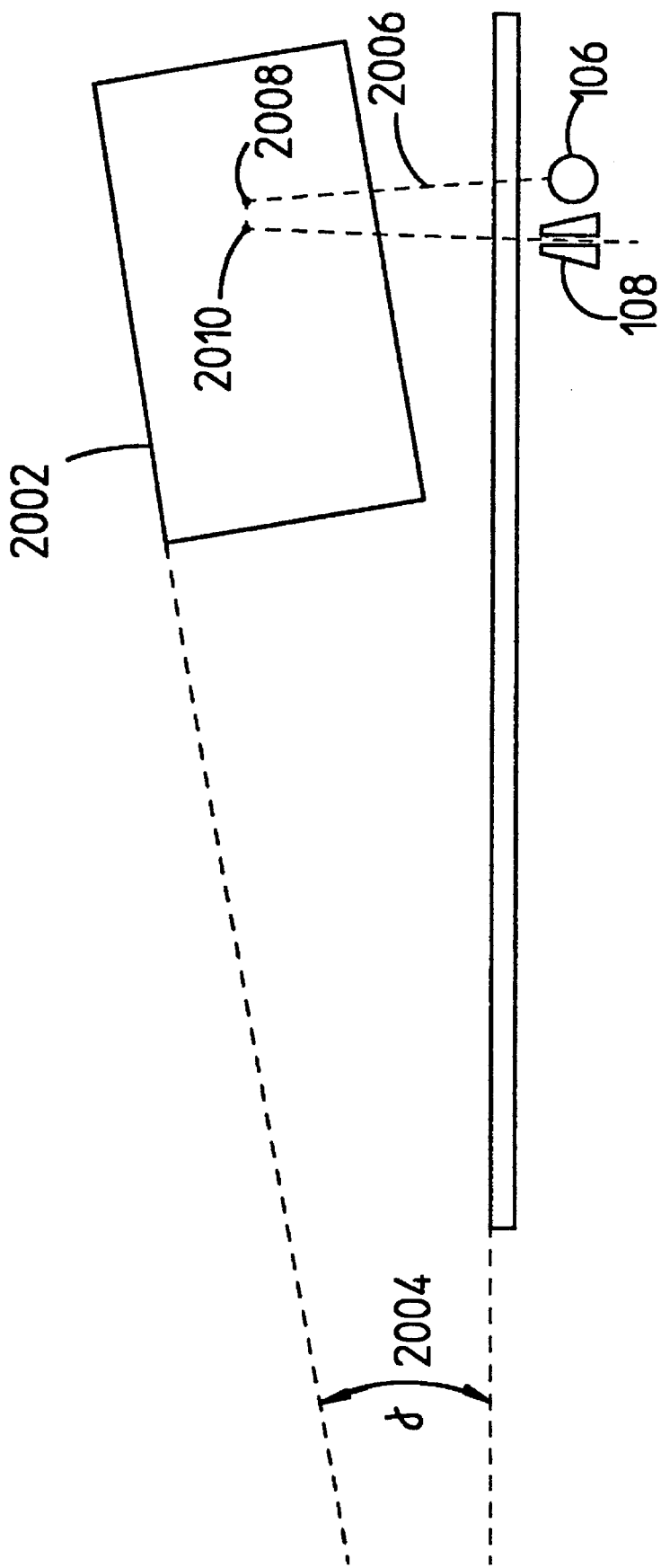
FIG. 20 is a mechanical side view of an adapter having a tilted two-mirror arrangement.

FIG. 20 is a side view of a two mirror adapter as in FIG. 3, with the line of intersection 2002 at an angle γ (2004) relative to the plane of the platen. The angle γ (2004) is exaggerated in FIG. 20 to facilitate illustration. A non-vertical light ray 2006 from the lamp 106 has a directional component parallel to the plane of the platen 104 in the direction toward the field stop 108. The light ray 2006 is first reflected at point 2008. At point 2008, because of the angle γ (2004), the horizontal directional component is partially subtracted. The light ray 2006 is reflected a second time at point 2010, where the remaining horizontal directional component is subtracted, so that light ray 2006 is then vertical relative to the plane of the platen (as viewed in FIG. 20 but not as viewed in FIG. 22). If a non-vertical entry angle is desired, the angle γ (2004) can be adjusted to partially subtract or to add as appropriate.

Figure 21:
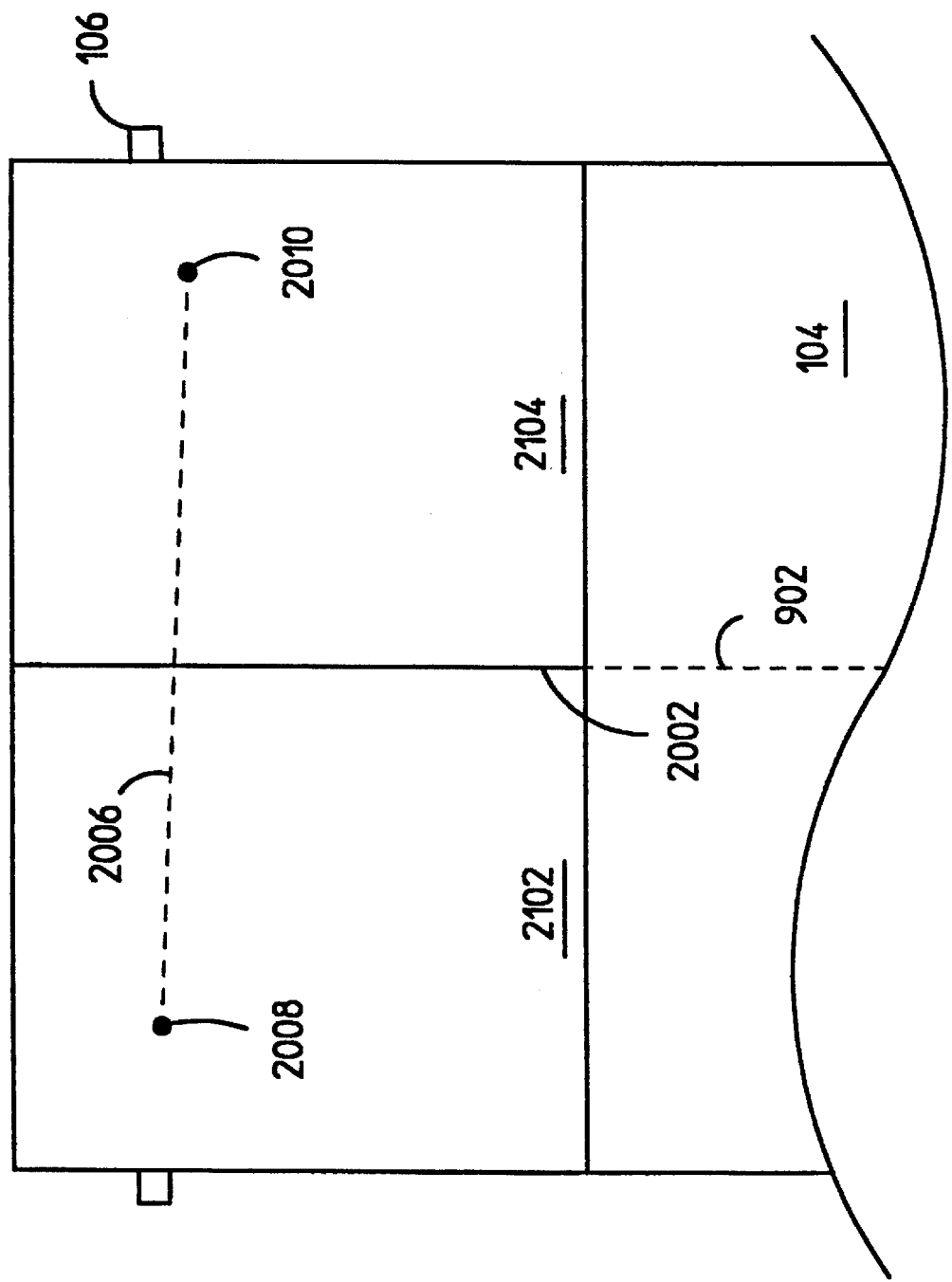
FIG. 21 is a mechanical top view of the adapter of FIG. 20.

FIG. 21 is a top view of the adapter of FIG. 20 to illustrate the result of the tilt on the light path. A non-vertical light ray 2006 from the lamp reflects off mirror 2102 at point 2008. At point 2008, the directional component along the direction of the centerline 902 is partially subtracted. The light is then reflected off of mirror 2104 at point 2010 where the remaining directional component along the direction of the centerline 902 is subtracted. As a result, the light passes through the back of the image vertically relative to the plane of the platen (as viewed in FIG. 20).

Figure 22:
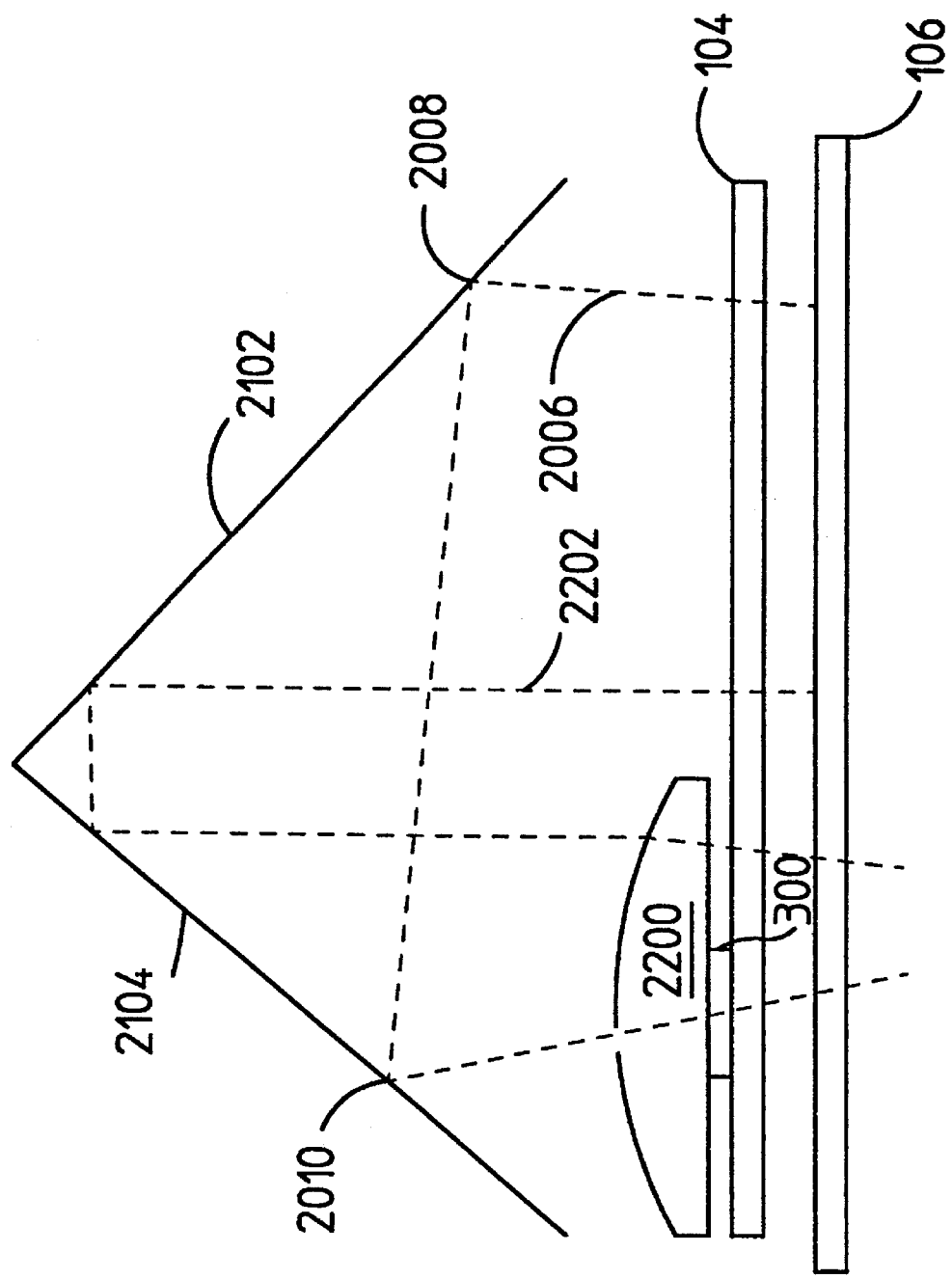
FIG. 22 is a mechanical end view of the adapter of FIG. 20.

FIG. 22 is an end view of the adapter of FIG. 20, illustrating an optional lens 2200. Light ray 2006 reflects off mirror 2102 at point 2008 where the horizontal component is partially subtracted. Light ray 2006 then reflects off mirror 2104 at point 2010 where the remaining horizontal component is subtracted. A second light ray 2202 is illustrated in FIG. 22. Because of the right angle reflectors, light rays 2006 and 2202 are substantially the same length. Light ray 2202, relative to light ray 2006, travels a longer distance before having the horizontal component partially subtracted and travels a shorter distance with a partial horizontal component. The net result is that total offset for the two light paths is the same. Referring back to FIG. 20, there is a slight change in offset from one end of the image to the other due to the slope of the planes as illustrated by the junction 2002. The effect of the slope of junction 2002 on offset change along the length of the image is negligible. In FIG. 22, the lens 2200 provides the same function as that discussed in conjunction with FIGS. 11 and 19. For small images (for example 35 mm), the lens 2200 is not necessary. As discussed in conjuction with FIG. 19, for a higher quality scan, the embodiment of FIG. 22 may be reduced in size to permit the image and lens to be centered over the scanner centerline.

The embodiment of FIGS. 20–22 with a tilted two-mirror arrangement can be manufactured at very low cost. In particular, a very low cost embodiment of FIGS. 20–22, without a lens, is implemented by folding a piece of thin reflective metal. An even lower cost embodiment is implemented by coating poster board or other similar thin low cost cardboard or plastic with a reflective material (for example aluminum or aluminized mylar) and folding the poster board along printed fold lines. The folded coated cardboard adapter is useful, for example, as a promotional object, with printed advertising, to be given away at trade shows or other promotional occasions.

Figure 23:
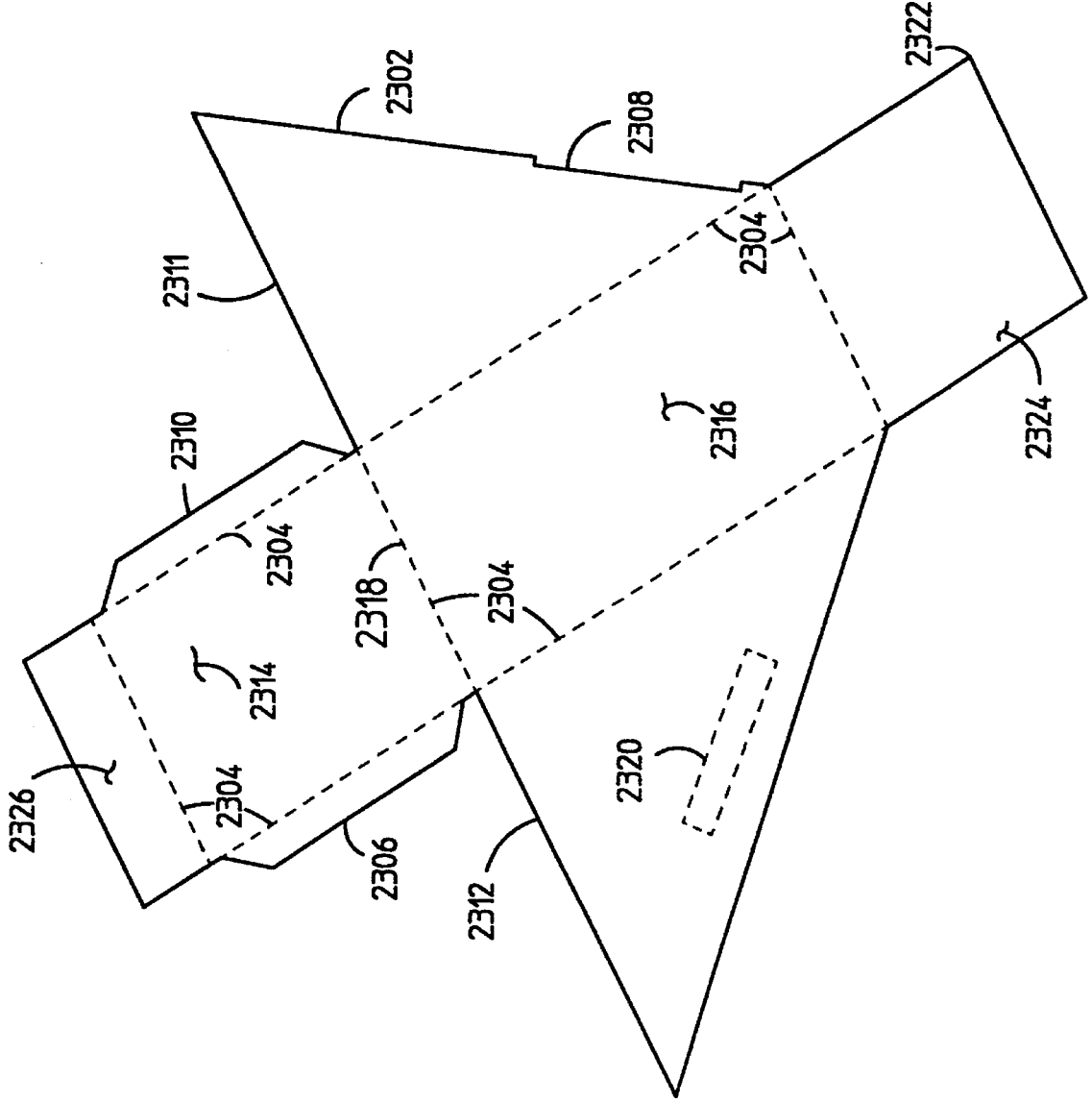
FIG. 23 is a mechanical plane view of a sheet of flat material that can be folded to form an adapter.

FIG. 23 illustrates the printed fold lines and cutting lines for a foldable adapter. The surface opposite the surface illustrated is reflective. In particular, the bottom surface of areas 2314 and 2316 provides reflective surfaces for back lighting in the assembled adapter. The outer boundary 2302 may be pre-scored to permit removal of waste material by "punching" the adapter from the remaining sheet. Alternatively, the outer boundary 2302 may be cut. Alternatively, the adapter may be provided pre-cut. The adapter is folded along the dashed lines 2304. Tab 2306 is folded over edge 2312. Tab 2310 is folded over edge 231. The folded tabs are secured using tape or other suitable adhesive. Notch 2308 provides clearance for the cardboard edge of a 35 mm slide. Line 2318 is the line of intersection of the reflective bottom surfaces of planes 2314 and 2316. Optionally, advertising may be printed on the adapter, for example, at location 2320. Reference corner 2322 is discussed below in conjunction with FIG. 24.

Figure 24:
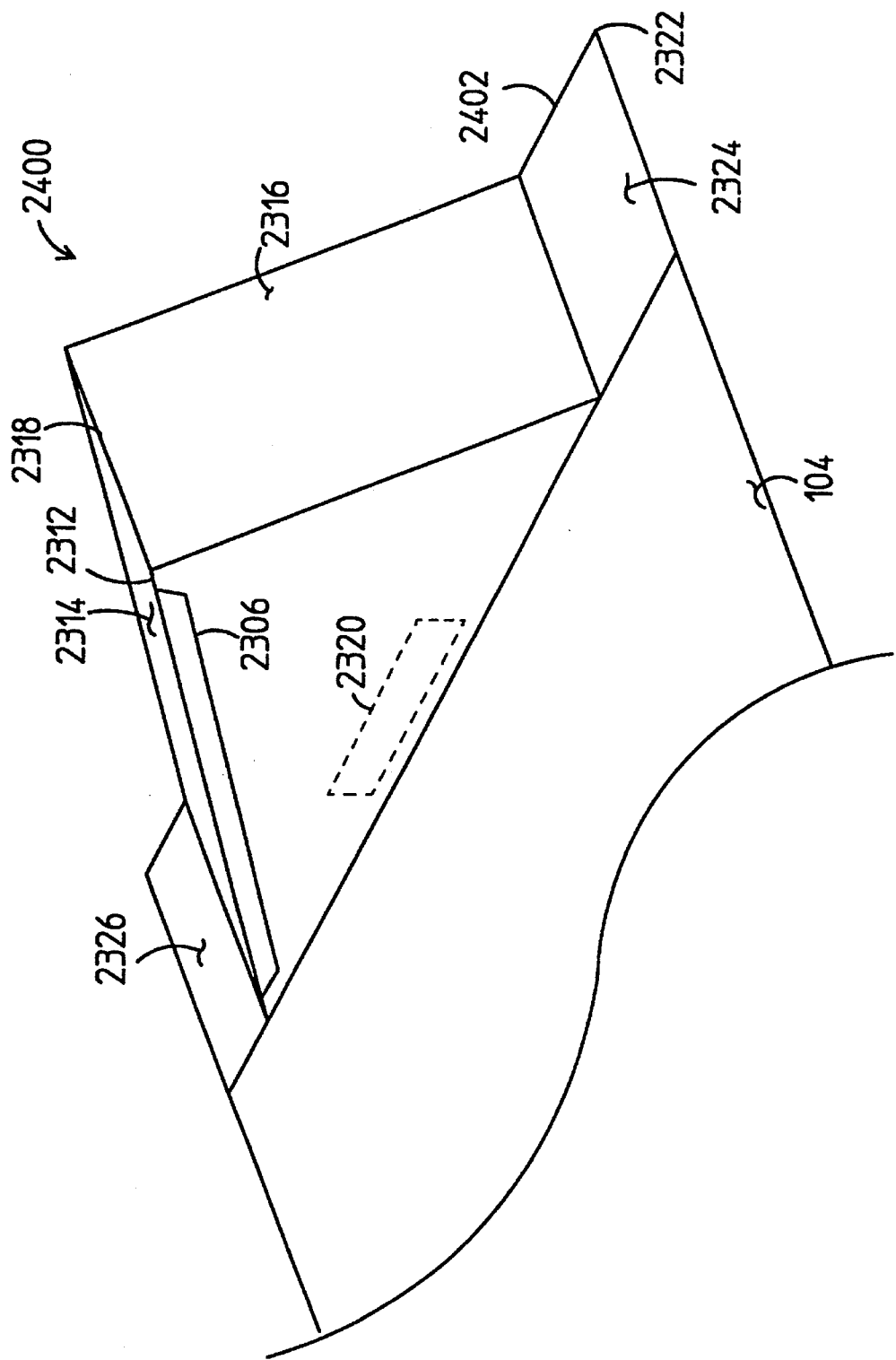
FIG. 24 is a mechanical perspective view of the adapter of FIG. 23 in folded form.

FIG. 24 is a perspective view of the assembled (folded) adapter 2400. Note in particular that the line of intersection 2318 is not parallel to the plane of the platen 104, thereby providing entry angle redirection as discussed in conjunction with FIGS. 20 and 21. Many reflective scanners provide a raised surface around the edges of the platen to facilitate alignment of paper on the platen. Likewise, adapter 2400 is positioned along one end 2402 of the platen. A transparent image is placed along the end 2402 of the platen directly below reflective surface 2316 at notch 2308 (FIG. 23). The reference corner 2322 of the adapter is placed at a corner of the platen 104, and the horizontal wings 2324 and 2326 secure the adapter between side edges of the platen 104.

To recap the various embodiments, the four-mirror embodiment of FIGS. 6A and 6B receives vertical light, offsets the light, and returns the light vertically into the scanner. The four-mirror embodiment of FIG. 7 receives non-vertical light, offsets the light and returns the light non-vertically into the scanner. The two-mirror embodiments of FIG. 16 (optical wedge) and FIG. 20 (tilted) receive non-vertical light, offset the light and return the light vertically into the scanner. It should be appreciated that these are representative samples of a large number of variations that could be made. For example, the embodiments of FIG. 16 and FIG. 20 can be adapted to return light into the scanner non-vertically, simply by choice of wedge angle or mirror angle. In the embodiments of FIGS. 16, the light starts at a non-vertical angle and the mirrors or wedge remove the horizontal component. If light is to be returned non-vertically, the angle of the wedge or mirrors can be adapted to add to the horizontal component to provide the proper entry angle as well as offset. A tilted mirror arrangement could provide offset for vertical light from the scanner and if necessary, an optical wedge could be used to provide the proper reentry angle. In FIG. 16, the light is reflected before passing through the wedge. It may be desirable in some scanner configurations for the light to pass through the wedge first, and then on to the mirrors.

With any of the adapters as illustrated in FIGS. 3, 8 and 12–25, the intensity of the light may not be uniform. For example, fluorescent lights inherently tend to be brighter at the midpoint than at the two ends. Note, for example, in FIG. 11 that the lens 1104 captures some light from the relatively low intensity end portion of the light source 106. Some reflective scanner manufacturers incorporate a variable width aperture in front of the light source to partially compensate for the lack of uniformity. In addition, reflective strips inside the scanner may be used to calibrate light sensors. In general, however, compensation may not be present or compensation designed for reflective scanning may not be adequate for transparency scanning. Illumination nonuniformity may also result from use of a lens such as lens 116 in FIG. 1 and lens 1104 in FIG. 11. Lenses inherently tend to transmit more light along the central optical axis than off the central axis. Regardless of the source of nonuniformity, if illumination nonuniformity is present for transparency scanning, compensation is needed for high accuracy.

Figure 25:
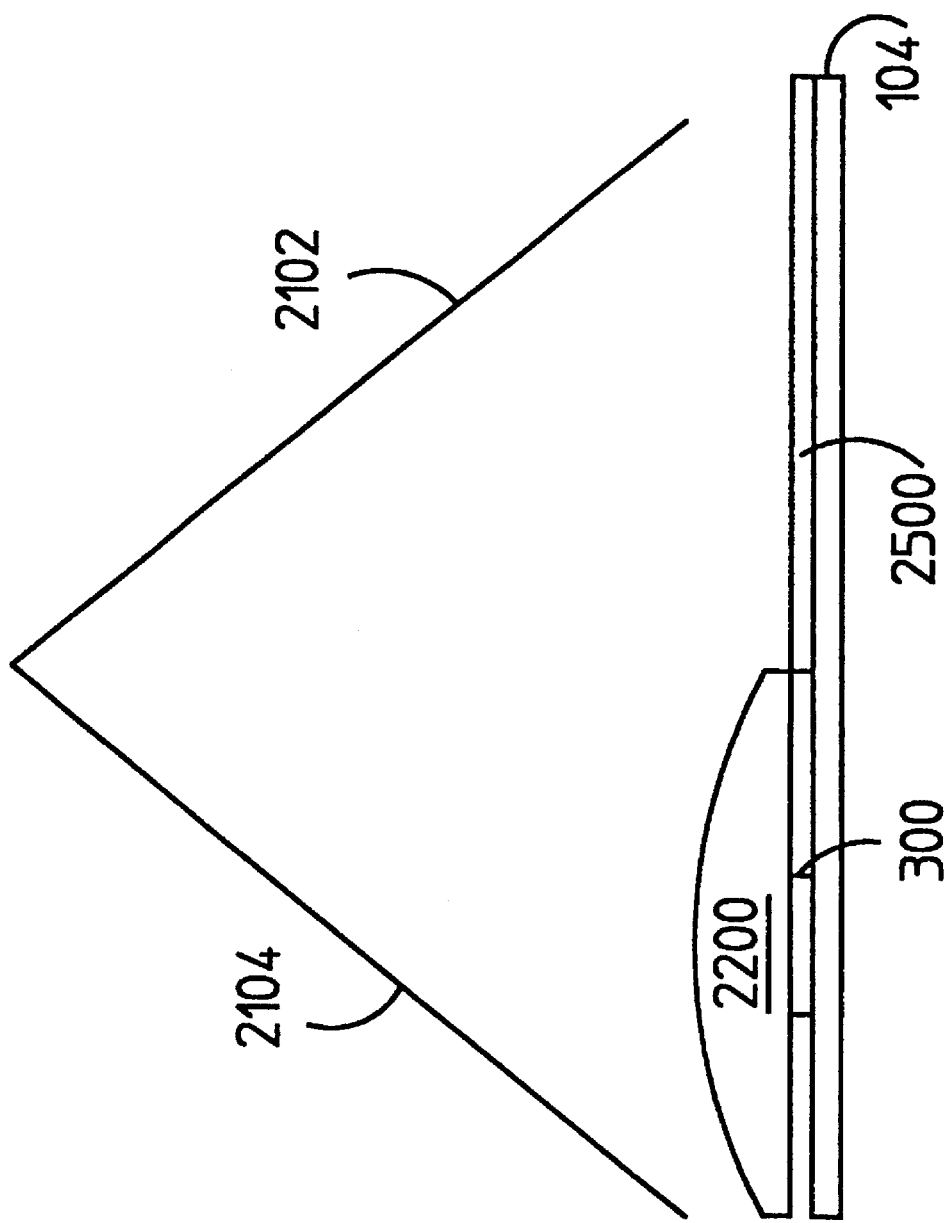
FIG. 25 is a mechanical end view of the adapter and lens configuration of FIG. 22 with an optical filter.

FIG. 25 illustrates the adapter arrangement of FIG. 22 with the addition of an optical filter for compensation of light intensity. An optical filter 2500 having a graduated or spatially varying optical density is placed on the platen 104 alongside the transparent image 300 so that light from the scanner 100 passes through the filter 2500 before being first reflected by mirror 2102. Placing the filter 2500 flat on the platen 104 is a matter of convenience. In general, a filter may be placed anywhere in the light path. Preferably, the filter should be placed away from the focal point of the internal lens (FIG. 1, 116) so that dirt, scratches or patterning in the filter will not be visible in the scanned image. Filter 2500 in FIG. 25 is illustrated with the adapter arrangement of FIG. 22 but the filter may be used with any of the passive adapters of the present invention.

High quality spatially variable density filters and halftoning screens are readily available commercially from providers of materials for photographic dark rooms. Alternatively, suitable filters can be made by simply printing a graduated halftone pattern on transparent material in a laser printer, ink-jet printer or other printer capable of printing overhead transparencies. Personal computer software for presentations and desktop publishing often includes a capability for graduated halftones, sometimes called "fountains."

Figure 26:
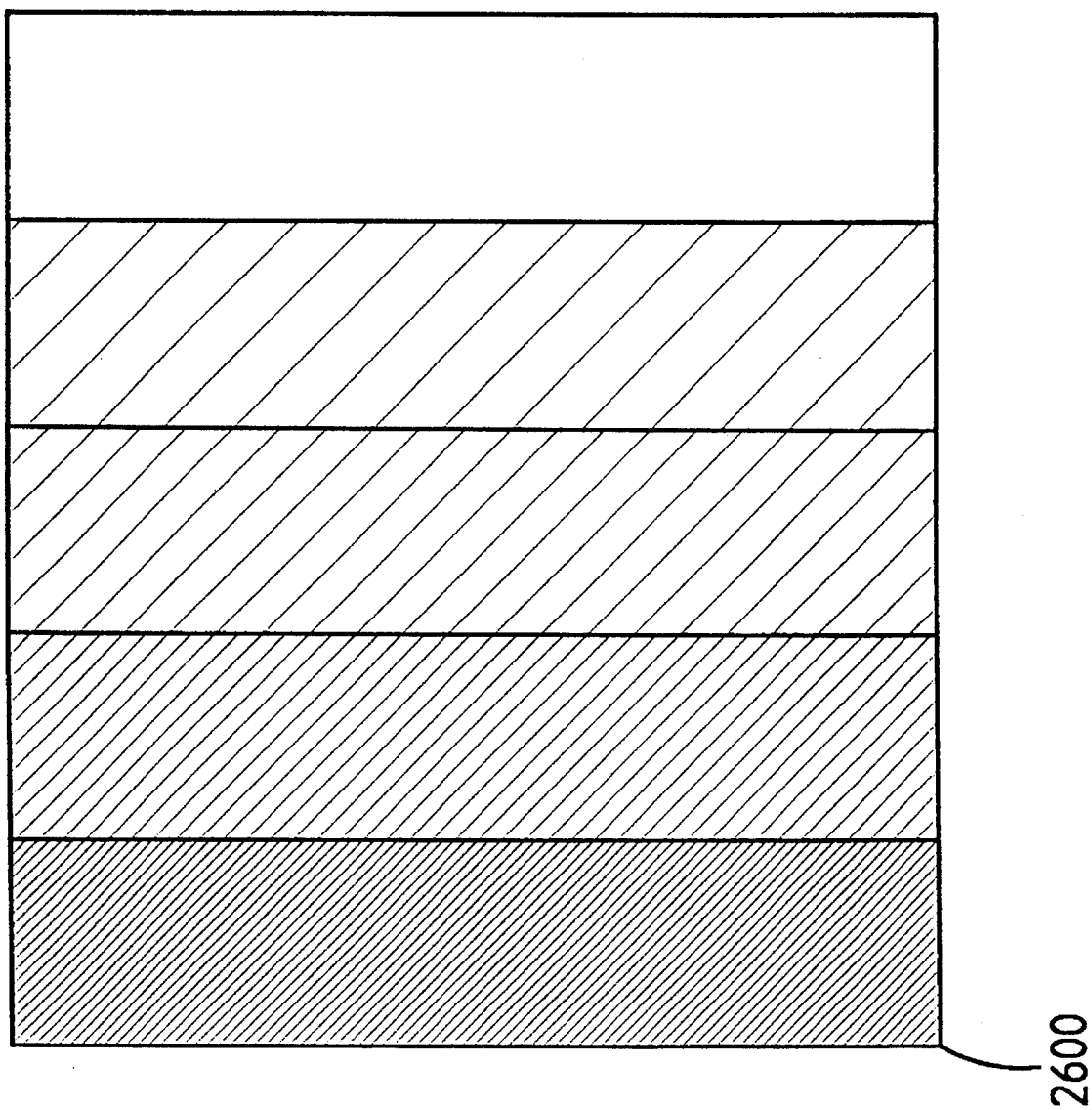
FIG. 26 is a magnified plane view of an example graduated density optical filter.

FIG. 26 depicts a magnified view of portions of a spatially variable density filter 2600 printed by a printer. FIG. 26 illustrates 5 discrete bands of variable spaced lines. Alternatively, variable spaced dots may be used. Personal computer software is capable of making the density change effectively continuous. If the printed dots or lines are sufficiently small, and if the filter 2600 is placed substantially away from the focal point of the internal lens (FIG. 1, 116), the discrete lines or dots will not be visible in the scanned image.

Whether or not a filter is needed may be determined by scanning using a transparency adapter but without any image present. The resulting numerical scanned image should have a uniform intensity. The filter should be transparent in the areas corresponding to the darkest portions of the numerical scanned image and more optically dense in areas corresponding to the lightest areas of the numerical scanned image.

In summary, the present invention provides a completely passive adapter for capturing light from a lamp which is internal to a reflective scanner and passing that light through a transparent image along the light path required by internal scanner optics. The various embodiments illustrated provide configurations suitable for most reflective scanner designs, even though the configurations of the scanner internal optical systems vary significantly.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An adapter for a reflective scanner, the reflective scanner having an internal light source, a reflective image area, and a transparency image area that is smaller than the reflective image area and contained within the reflective image area, the adapter comprising:

a reflector, wherein when the adapter is placed onto the reflective scanner, some of the light from the internal light source that passes through the reflective image area but outside the transparency image area is redirected by the reflector through the transparency image area and back into the reflective scanner.

2. The adapter of claim 1, the adapter further comprising:

an optical filter having a spatially varying optical density, the optical filter placed so that the light that is redirected through the transparency image area also passes through the optical filter.

3. The adapter of claim 1, the reflective image area lying in an image area plane, an illumination line on the image area plane, the scanner having an internal light path that intersects the image area plane at a distance O from the illumination line, the adapter further comprising:

means for offsetting the light from the internal light source so that the light that is redirected through the transparency image area is along the internal light path.

4. The adapter of claim 3, the adapter further comprising:

an optical filter having a spatially varying optical density, the optical filter placed so that the light that is redirected through the transparency image area also passes through the optical filter.

5. The adapter of claim 3, the scanner further comprising a centerline in the image plane, light from the light source diverging from the centerline, the adapter further comprising:

a lens, the lens refracting the diverging light from the light source so that the light redirected through the transparency area converges toward the centerline.

6. The adapter of claim 5, the adapter further comprising:

an optical filter having a spatially varying optical density, the optical filter placed so that the light that is redirected through the transparency image area also passes through the optical filter.

7. The adapter of claim 3, the scanner having a first direction parallel to the image area plane, perpendicular to the illumination line, the means for offsetting further comprising:

a first reflector lying in a first reflector plane;

second and third reflectors;

a fourth reflector lying in a fourth reflector plane;

the first and fourth reflector planes being parallel and separated by the distance O in the first direction; and light from the internal light source being reflected from the first reflector to the second reflector, from the second reflector to the third reflector, from the third reflector to the fourth reflector, and from the fourth reflector through the transparency image area.

8. The adapter of claim 7, the adapter further comprising:

an optical filter having a spatially varying optical density, the optical filter placed so that the light that is redirected through the transparency image area also passes through the optical filter.

9. The adapter of claim 7, the scanner further comprising a centerline in the image plane, light from the light source diverging from the centerline, the adapter further comprising:

a lens, the lens refracting the diverging light from the light source so that the light redirected through the transparency area converges toward the centerline.

10. The adapter of claim 9, the adapter further comprising:

an optical filter having a spatially varying optical density, the optical filter placed so that the light that is redirected through the transparency image area also passes through the optical filter.

11. The adapter of claim 3, the means for offsetting further comprising:

first and second reflectors;

an optical wedge; and light from the internal light source passing first to the first reflector, from the first reflector to the second reflector, from the second reflector through the optical wedge, from the optical wedge through the image area with an offset of distance O along the first direction between the first point and the second point.

12. The adapter of claim 11, the adapter further comprising:

an optical filter having a spatially varying optical density, the optical filter placed so that the light that is redirected through the transparency image area also passes through the optical filter.

13. The adapter of claim 11, the scanner further comprising a centerline in the image plane, light from the light source diverging from the centerline, the adapter further comprising:

a lens, the lens refracting the diverging light from the light source so that the light redirected through the transparency area converges toward the centerline.

14. The adapter of claim 13, the adapter further comprising:

an optical filter having a spatially varying optical density, the optical filter placed so that the light that is redirected through the transparency image area also passes through the optical filter.

15. The adapter of claim 3, the means for offsetting further comprising:

a first reflector lying in a first reflector plane;

a second reflector lying in a second reflector plane;

the first and second reflector planes intersecting along an intersection line;

the intersection line non-parallel to the image area plane; and light from the internal light source having a directional component along the first direction, the light from the internal light source reflecting from the first reflector with a reduced directional component along the first direction, then reflecting from the second reflector with a further reduced directional component along the first direction, then passing through the image area with a net offset of distance O in the first direction relative to the light source.

16. The adapter of claim 15, the adapter further comprising:

an optical filter having a spatially varying optical density, the optical filter placed so that the light that is redirected through the transparency image area also passes through the optical filter.

17. The adapter of claim 15, the scanner further comprising a centerline in the image plane, light from the light source diverging from the centerline, the adapter further comprising:

a lens, the lens refracting the diverging light from the light source so that the light redirected through the transparency area converges toward the centerline.

18. The adapter of claim 17, the adapter further comprising:

an optical filter having a spatially varying optical density, the optical filter placed so that the light that is redirected through the transparency image area also passes through the optical filter.

19. The adapter of claim 3, the light path at an angle A relative to the image plane, the light redirected through the image area at the angle A relative to the image plane.

20. The adapter of claim 19, the adapter further comprising:

an optical filter having a spatially varying optical density, the optical filter placed so that the light that is redirected through the transparency image area also passes through the optical filter.

21. The adapter of claim 19, the scanner further comprising a centerline in the image plane, light from the light source diverging from the centerline, the adapter further comprising:

a lens, the lens refracting the diverging light from the light source so that the light redirected through the transparency area converges toward the centerline.

22. The adapter of claim 21, the adapter further comprising:

an optical filter having a spatially varying optical density, the optical filter placed so that the light that is redirected through the transparency image area also passes through the optical filter.

23. The adapter of claim 19, the scanner having a first direction parallel to the image area plane, perpendicular to the illumination line, the adapter further comprising:

a first reflector lying in a first reflector plane, the first reflector plane at an angle of A/2 relative to the image plane; second and third reflectors;

a fourth reflector lying in a fourth reflector plane, the fourth reflector plane at an angle of 90°−A/2 relative to the image plane;

light from the internal light source being reflected from the first reflector to the second reflector, from the second reflector to the third reflector, from the third reflector to the fourth reflector, and from the fourth reflector through the transparency image area.

24. The adapter of claim 23, the adapter further comprising:

an optical filter having a spatially varying optical density, the optical filter placed so that the light that is redirected through the transparency image area also passes through the optical filter.

25. The adapter of claim 23, the scanner further comprising a centerline in the image plane, light from the light source diverging from the centerline, the adapter further comprising:

a lens, the lens refracting the diverging light from the light source so that the light redirected through the transparency area converges toward the centerline.

26. The adapter of claim 25, the adapter further comprising:

an optical filter having a spatially varying optical density, the optical filter placed so that the light that is redirected through the transparency image area also passes through the optical filter.

27. The adapter of claim 19, the scanner having a first direction parallel to the image area plane, perpendicular to the illumination line, the adapter further comprising:

a first reflector lying in a first reflector plane, the first reflector plane at an angle of A/2 relative to the image plane; second and third reflectors;

a fourth reflector lying in a fourth reflector plane, the fourth reflector plane at an angle of 90°–A/2 relative to the image plane; fifth and sixth reflectors;

a seventh reflector lying in a seventh reflector plane, the seventh reflector plane at an angle of A/2 relative to the imaging plane;

light from the internal light source being reflected from the first reflector to the second reflector, from the second reflector to the third reflector, from the third reflector to the fourth reflector, and from the fourth reflector through the transparency image area; and light from the internal light source being reflected from the seventh reflector to the sixth reflector, from the sixth reflector to the fifth reflector, from the fifth reflector to the fourth reflector, and from the fourth reflector through the transparency image area.

28. The adapter of claim 27, the adapter further comprising:

an optical filter having a spatially varying optical density, the optical filter placed so that the light that is redirected through the transparency image area also passes through the optical filter.

29. The adapter of claim 27, the scanner further comprising a centerline in the image plane, light from the light source diverging from the centerline, the adapter further comprising:

a lens, the lens refracting the diverging light from the light source so that the light redirected through the transparency area converges toward the centerline.

30. The adapter of claim 29, the adapter further comprising:

an optical filter having a spatially varying optical density, the optical filter placed so that the light that is redirected through the transparency image area also passes through the optical filter.

31. A method for adapting a reflective scanner for use in scanning a transparent image, the method comprising the following steps:

(A) receiving light from the interior of the scanner that passes through a reflective image area but passes outside a transparency image area that is contained within the reflective image area; and (B) redirecting the received light through the transparency image area back into the scanner.

32. The method of claim 31, the reflective image area lying in an image area plane, an illumination line on the image area plane, the scanner having an internal light path that intersects the image area plane at a distance 0 from the illumination line, step (B) further comprising:

(B1) redirecting the received light through the transparency image area back into the scanner along the internal light path.

33. The method of claim 32, the scanner further comprising a centerline in the image plane, light from the light source diverging from the centerline, step (B1) further comprising:

(B1a) redirecting the received light through a lens;

(B1b) refracting the diverging light from the light source, by the lens, so that the light passing through the lens converges toward the centerline; and (B1c) directing light from the lens through the transparency image area back into the scanner along the internal light path.

34. The method of claim 32, step (A) further comprising: (A1) passing the received light through an optical filter having a spatially variable optical density.

35. The method of claim 34, the scanner further comprising a centerline in the image plane, light from the light source diverging from the centerline, step (B1) further comprising:

(B1a) redirecting the received light through a lens;

(B1b) refracting the diverging light from the light source, by the lens, so that the light passing through the lens converges toward the centerline; and (B1c) directing light from the lens through the transparency image area back into the scanner along the internal light path.

\* \* \* \* \*